US012374822B2

(12) United States Patent
Chen et al.

(10) Patent No.: US 12,374,822 B2
(45) Date of Patent: Jul. 29, 2025

(54) SOCKET DEVICE

(71) Applicant: Anker Innovations Technology Co., Ltd., Changsha (CN)

(72) Inventors: Tao Chen, Shenzhen (CN); Xiang Zhang, Shenzhen (CN); Shuibo Tong, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 0 days.

(21) Appl. No.: 19/071,351

(22) Filed: Mar. 5, 2025

(65) Prior Publication Data

US 2025/0202156 A1 Jun. 19, 2025

Related U.S. Application Data

(63) Continuation of application No. 18/898,835, filed on Sep. 27, 2024, which is a continuation of application No. PCT/CN2023/084125, filed on Mar. 27, 2023.

(30) Foreign Application Priority Data

Mar. 28, 2022 (CN) ........................ 202210315112.0
Apr. 15, 2022 (CN) ........................ 202220895652.6

(51) Int. Cl.
*H01R 13/502* (2006.01)
*H01R 13/629* (2006.01)

(52) U.S. Cl.
CPC ......... *H01R 13/502* (2013.01); *H01R 13/629* (2013.01)

(58) Field of Classification Search
CPC ............................ H01R 13/502; H01R 13/629
See application file for complete search history.

(56) References Cited

U.S. PATENT DOCUMENTS

2019/0067966 A1* 2/2019 Zhang ...................... H02J 7/00
2025/0023285 A1* 1/2025 Chen ................... H01R 13/502

FOREIGN PATENT DOCUMENTS

CN 109787006 A * 5/2019
CN 215834853 U 2/2022
EP 1331499 A1 7/2003

OTHER PUBLICATIONS

Jun. 21, 2023 (CN)—International Search Report of PCT/CN2023/084125.
Oct. 17, 2024 (CN) CN Office Action of 202210315112.0.

* cited by examiner

*Primary Examiner* — Abdullah A Riyami
*Assistant Examiner* — Nader J Alhawamdeh
(74) *Attorney, Agent, or Firm* — Banner & Witcoff, Ltd.

(57) ABSTRACT

A socket device (e.g., a charging device) comprising a housing and a movable cover coupled to the housing and being movable relative to the housing between a use position and a stowed position. The housing may comprise a movable assembly and a transfer structure. The movable cover in the use position may project above, at least partially, an outer surface of the housing. The housing may comprise a transfer structure. The transfer structure may have an axis and may be configured to rotate about the axis. The movable assembly may be configured to, in response to the insertion of the plug device, cause rotation of the transfer structure to move the movable cover from the stowed position to the use position.

20 Claims, 24 Drawing Sheets

SOCKET DEVICE

CROSS-REFERENCE TO RELATED APPLICATIONS

This application is a continuation of U.S. application Ser. No. 18/898,835, filed on Sep. 27, 2024, which claims priority to International Application No. PCT/CN2023/084125, filed on Mar. 27, 2023, which claims priority to Chinese Application No. 202210315112.0, filed on Mar. 28, 2022, and Chinese Application No. 202220895652.6, filed on Apr. 15, 2022. The entire disclosures of each of the above applications are incorporated herein by reference.

TECHNICAL FIELD

The present disclosure relates to the technical field of electrical accessories, in particular to a socket device (e.g., a charging device, a power strip).

BACKGROUND

A socket device is used to fit a plug device to connect to a power circuit. To accommodate pins of the plug device, the socket device needs to provide a certain accommodation space, which makes it difficult to significantly reduce the size of the socket device. For example, among dimensions of length, width, and height of the socket device applicable to the Chinese, U.S., and Japanese specifications, the minimum height is approximately 24.5 mm. This dimension limitation has an adverse effect on the portability of the socket device.

Accordingly, in view of the above facts, it is useful to provide a socket device to at least partially solve the foregoing problem.

SUMMARY

The present disclosure describes a charging device comprising: a housing; and a movable cover coupled to the housing and being movable relative to the housing between a use position and a stowed position. The movable cover in the use position may project above, at least partially, an outer surface of the housing. The charging device may further comprise a movable assembly configured to move in the housing in response to an insertion of a plug device. In addition, the charging device may further comprise a transfer structure in the housing. The transfer structure may have an axis and may be configured to rotate about the axis. The movable assembly may be configured to, in response to the insertion of the plug device, cause rotation of the transfer structure to move the movable cover from the stowed position to the use position.

The present disclosure describes a socket device comprising: a housing; and a socket coupled to the housing. The socket may comprise a cover that is movable between a use position and a stowed position. When the movable cover is in the use position, it may extend, at least partially, above an outer surface of the housing. The socket device may further comprise a drive assembly in the housing and configured to move the cover between its use and stowed positions.

BRIEF DESCRIPTION OF THE DRAWINGS

The following accompanying drawings, as a part of the present disclosure, are used for the purpose of understanding the present disclosure. Examples of the present disclosure and a description thereof are shown in the accompanying drawings and are used to explain the principles of the present disclosure. In the drawings.

Figure 1A:
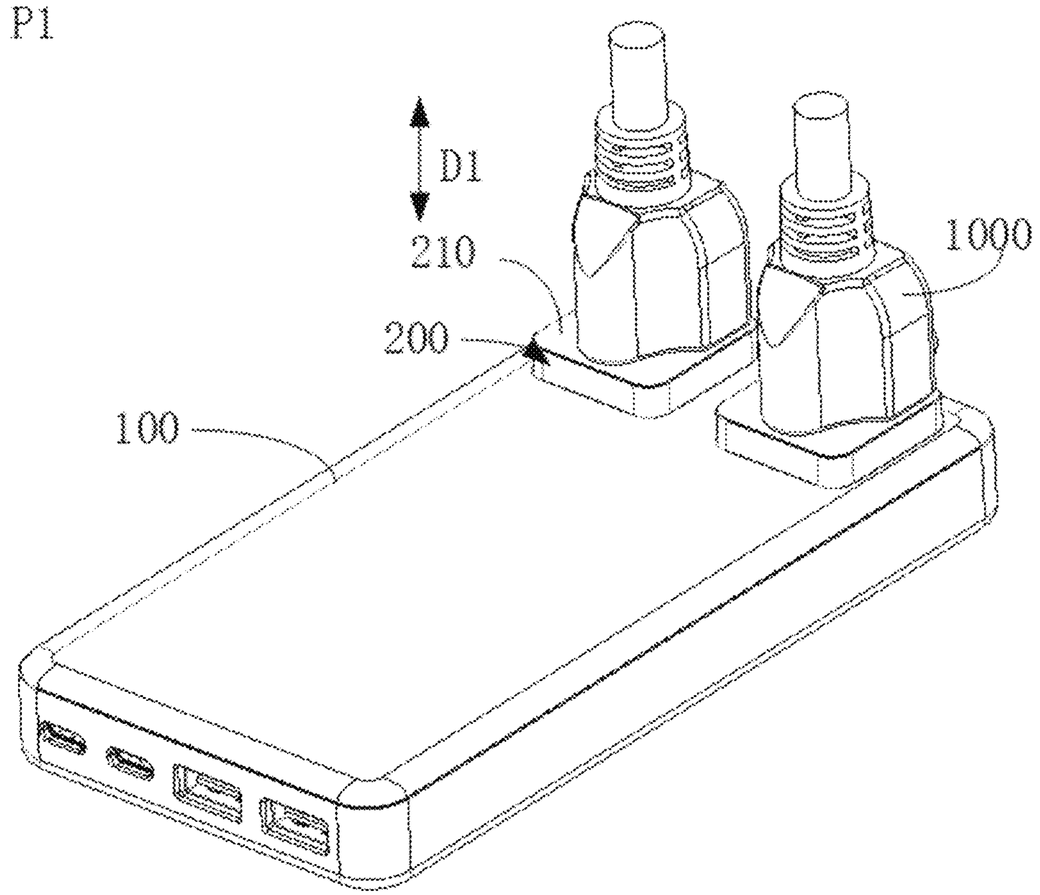
FIG. 1A shows a three-dimensional schematic view of a movable cover of a socket device in a use position according to an example of the present disclosure.

Description of Reference Numerals: 100: base body; 110: upper base body; 111: opening; 112: second spring locating post; 120: lower base body; 130: accommodating space; 200: movable cover; 210: panel portion; 211: jack 211*a*: first jack; 211*b*: second jack; 220: support portion; 230: eave body portion; 231: guide post; 231*a*: second spring locating hole; 300: bracket; 310: first guide groove; 311: locking port; 320: second insertion notch; 330: guide hole; 340: guide groove; 350: pivot shaft; 400: floating member; 410: second guide groove; 411: locking via hole; 412: first spring locating post; 420: first insertion notch; 430: first guiding block; 500: self-locking member; 510: locking projection; 520: guiding slope; 521: first end; 522: second end; 530: first spring locating hole; 540: connection portion; 541: second guiding block; 600: transmission assembly; 610: first rack; 620: second rack; 630: gear; 700: first compression spring; 710: second compression spring; 800: insertion via hole; 1000: plug device; 1010: pin; 1011: first pin; 1012: second pin; 10: drive assembly; 104: power cord; 114: first reset member; 115: second reset member; P1: use position; P2: stowed position; DP1: first dimension; DP2: second dimension; D1: first direction; D2: second direction; and D3: third direction.

DETAILED DESCRIPTION

In the following description, a great deal of specific detail is given in order to provide a more thorough understanding of the present disclosure. However, it will be apparent to those skilled in the art that the examples of the present disclosure can be implemented without one or more of these details. In other examples, some of the technical features that are well known in the art are not described in order to avoid confusion with the examples of the present disclosure.

For a thorough understanding of the examples of the present disclosure, a detailed structure will be presented in the following description. The implementation of the examples of the present disclosure is not limited to particular details familiar to those skilled in the art.

In order to solve, at least in part, the foregoing technical problem, the present disclosure provides a socket device, as shown in at least FIG. 1A to FIG. 2B. The socket device includes: a base body 100 (e.g., a housing) having an accommodating space therein; a movable cover 200 movably disposed on the base body 100 along a first direction D1 between a use position P1 and a stowed position P2. The movable cover 200 in the use position P1 extends, at least partially, beyond the base body 100. The socket device further includes jacks 211 (e.g., holes for receiving a plug device) disposed in the base body 100 or the movable cover 200. The jacks 211 match pins 1010 of the plug device 1000. The socket device includes a drive assembly disposed in the accommodating space and connected to the movable cover 200. The drive assembly is configured to: switch the movable cover 200 from the stowed position P2 to the use position P1 with insertion of the plug device 1000, and reset the movable cover 200 to the stowed position P2 with pulling out of the plug device 1000.

The socket device of an example of the present disclosure enables the movable cover 200 to be switched from the stowed position P2 to the use position P1 with insertion of the plug device 1000 and to be reset to the stowed position P2 with pulling out of the plug device 1000 through the drive assembly, so that when the plug device 1000 is inserted, the movable cover 200 can move to the use position P1 to surround the pins 1010 of the plug device 1000, realizing a normal power supply function of the socket device while avoiding exposure of the pins 1010, thereby improving safety. After the plug device 1000 is pulled out (e.g., removed from the socket device), the movable cover 200 moves to the stowed position P2, so that a thickness of the socket device is thinner than that of sockets in the related art, which improves comfort of use and is more convenient to store and carry.

Figure 1B:
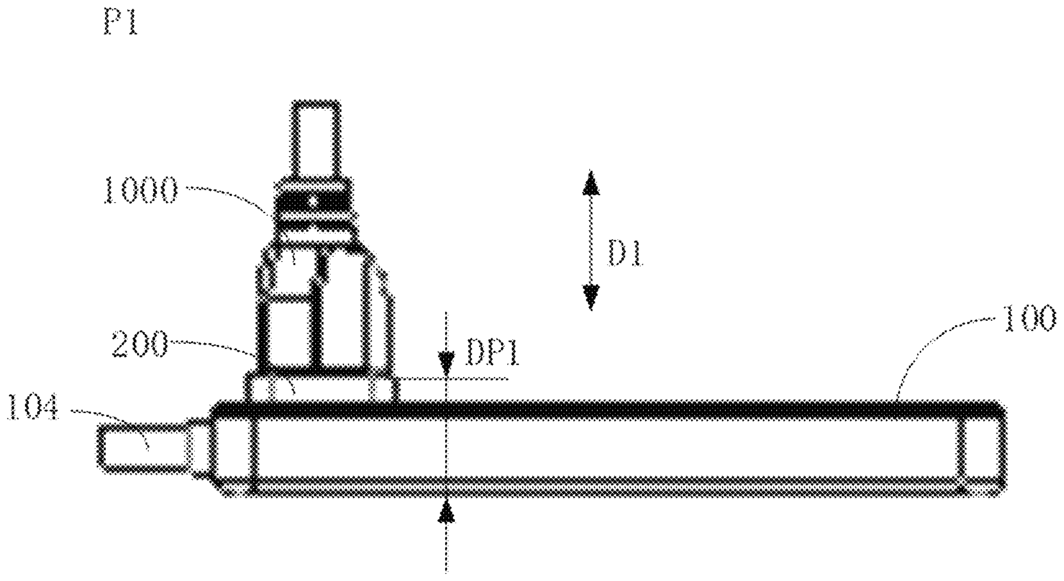
FIG. 1B shows a side view of the movable cover of the socket device in a use position according to an example of the present disclosure.
Figure 2A:
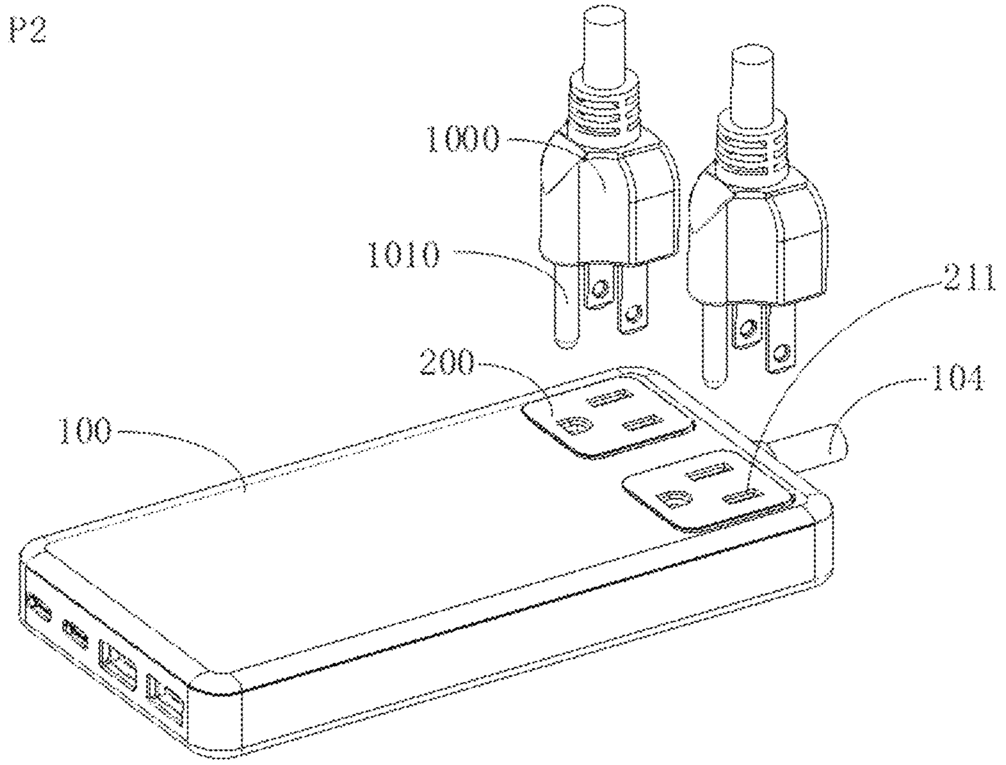
FIG. 2A shows a three-dimensional schematic view of the movable cover of the socket device in a stowed position according to an example of the present disclosure.
Figure 2B:
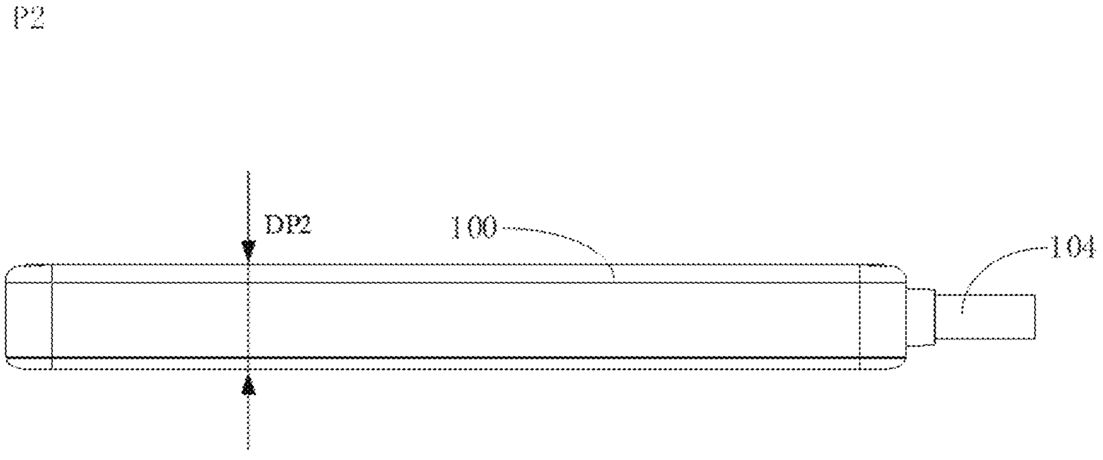
FIG. 2B shows a side view of the movable cover of the socket device in a stowed position according to an example of the present disclosure.
Figure 3:
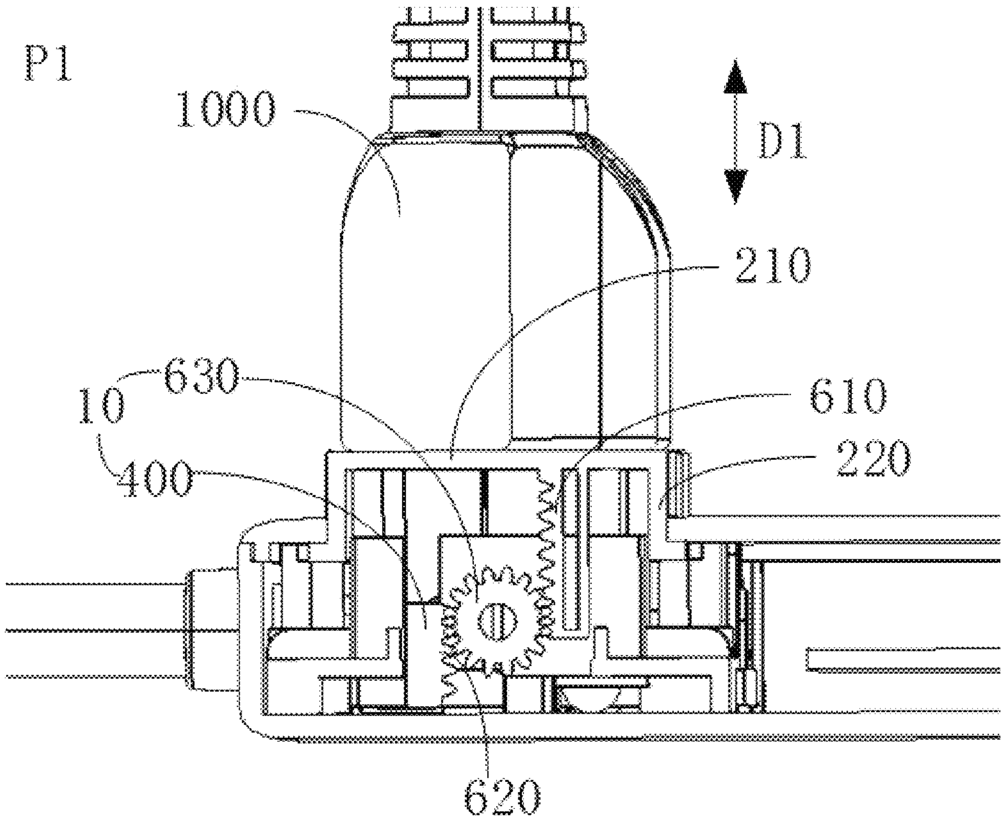
FIG. 3 shows a first partial sectional view of the movable cover of the socket device in a stowed position according to an example of the present disclosure.
Figure 4:
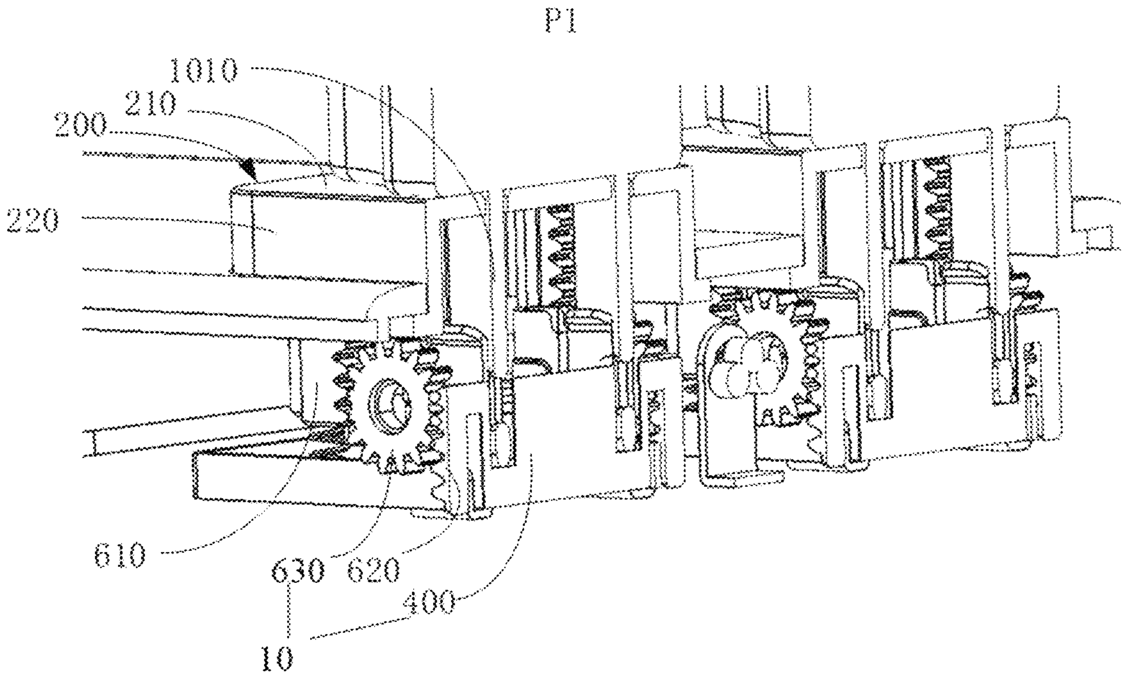
FIG. 4 shows a second partial sectional view of the movable cover of the socket device in the stowed position according to an example of the present disclosure.
Figure 5:
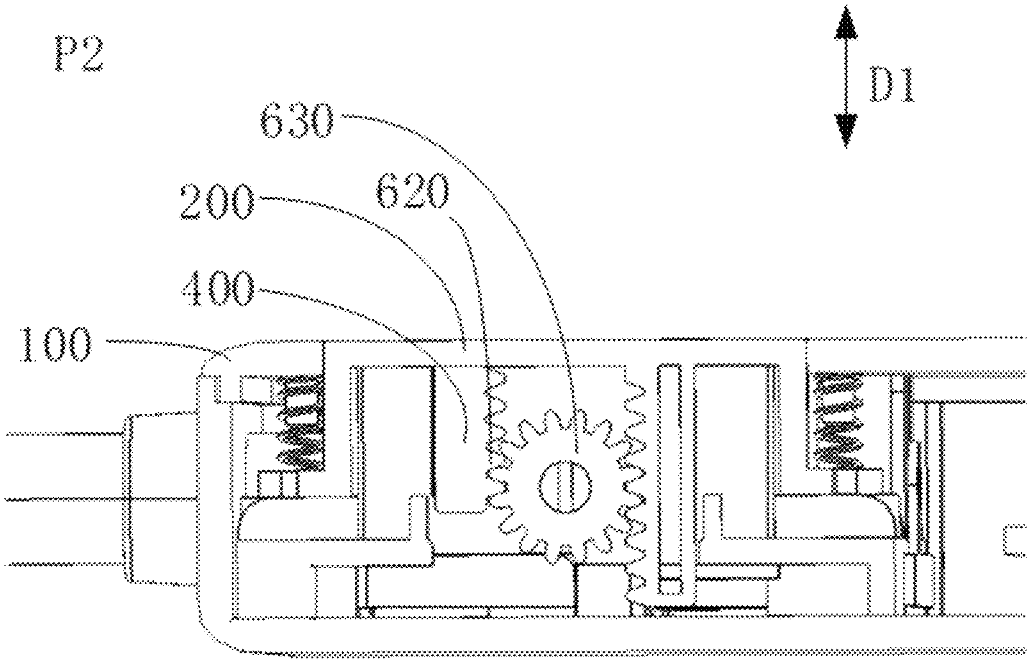
FIG. 5 shows a first partial sectional view of the movable cover of the socket device in a use position according to an example of the present disclosure.
Figure 6:
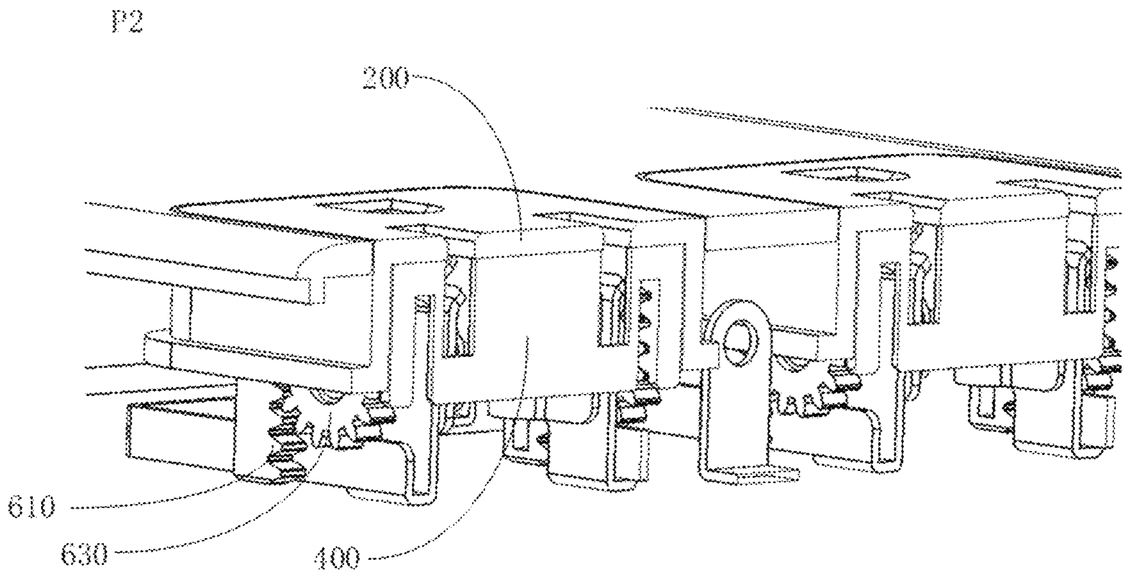
FIG. 6 shows a second partial sectional view of the movable cover of the socket device in a use position according to an example of the present disclosure in the use position.
Figure 7:
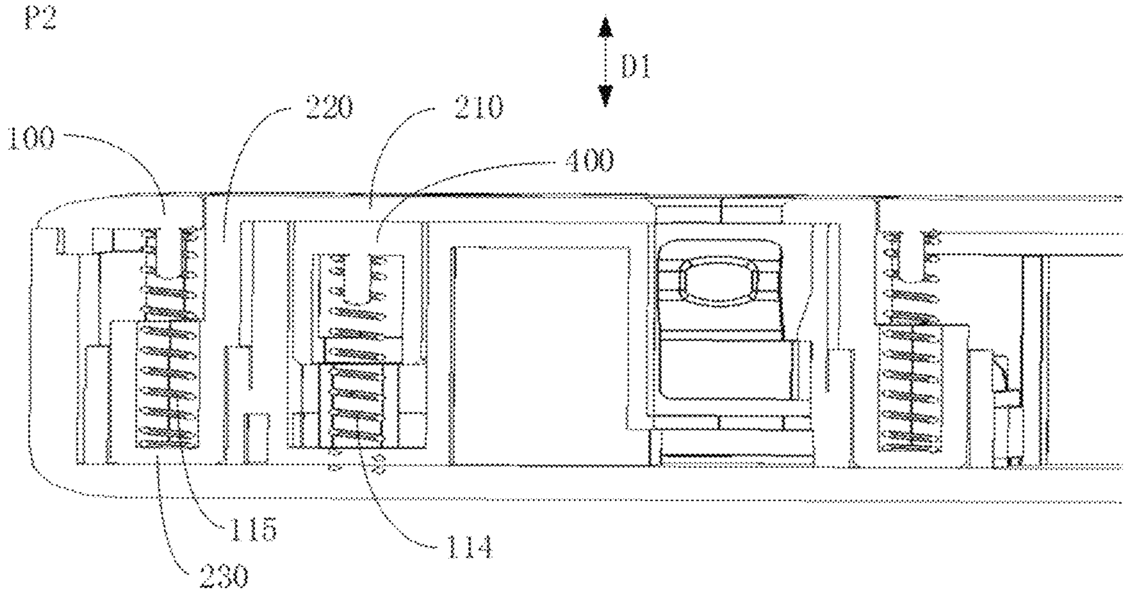
FIG. 7 shows a third partial sectional view of the movable cover of the socket device in a stowed position according to an example of the present disclosure in the stowed position.
Figure 8:
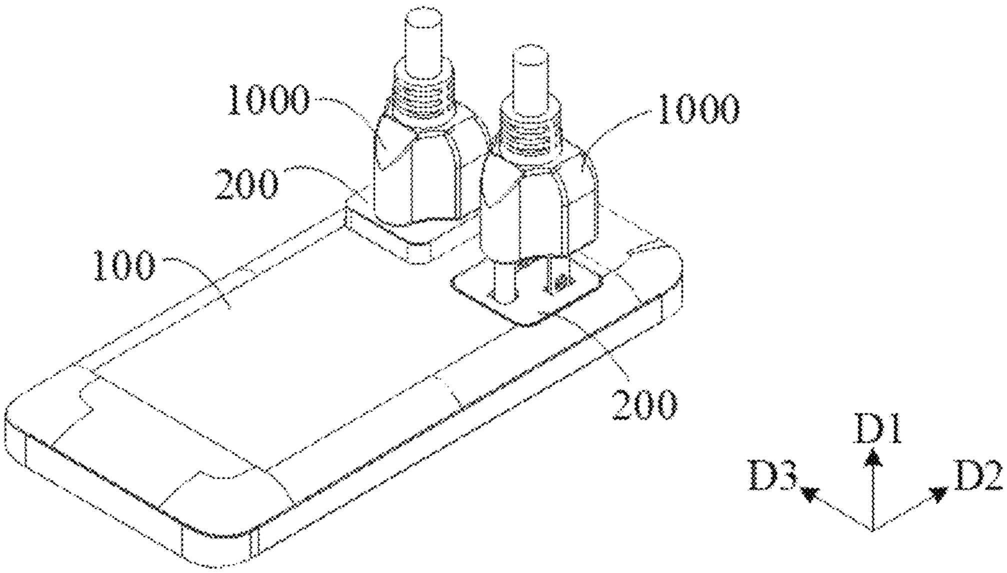
FIG. 8 shows a three-dimensional view of a socket device connected to a plug device according to an example of the present disclosure.
Figure 9:
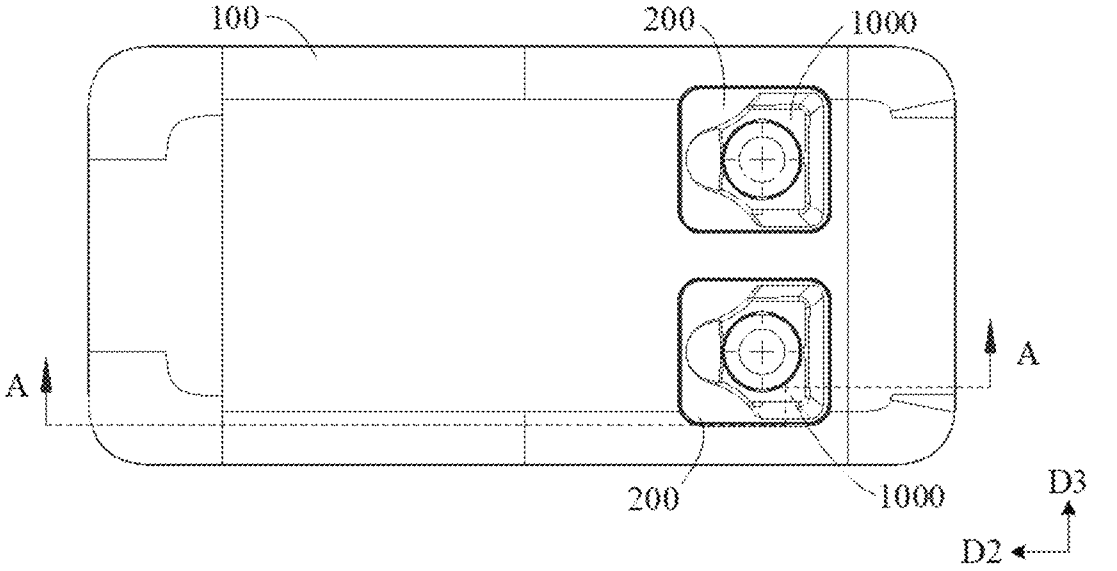
FIG. 9 shows a top view of the socket device connected to the plug device shown in FIG. 8.

The detailed structure of a socket device in an example of the present disclosure is described below in conjunction with at least FIG. 1 to FIG. 7, and technical features of examples of the present disclosure may be combined with each other. FIG. 1A shows a three-dimensional schematic view of a movable cover of a socket device in a use position according to an example of the present disclosure. FIG. 1B shows a side view of the movable cover of the socket device in a use position according to an example of the present disclosure. FIG. 2A shows a three-dimensional schematic view of the movable cover of the socket device in a stowed position according to an example of the present disclosure. FIG. 2B shows a side view of the movable cover of the socket device in a stowed position according to an example of the present disclosure. FIG. 3 shows a first partial sectional view of the movable cover of the socket device in a stowed position according to an example of the present disclosure. FIG. 4 shows a second partial sectional view of the movable cover of the socket device in a stowed position according to an example of the present disclosure. FIG. 5 shows a first partial sectional view of the movable cover of the socket device in a use position according to an example of the present disclosure. FIG. 6 shows a second partial sectional view of the movable cover of the socket device in a use position according to an example of the present disclosure. FIG. 7 shows a third partial sectional view of the movable cover of the socket device in a stowed position according to an example of the present disclosure.

A socket device (e.g., an electronic socket) is a device having jacks for an electrical cable to be inserted into so as to access a power circuit. Common jacks include standard three-hole jacks, standard three-hole jacks, USB jacks (e.g., ports), and the like. The following description and the accompanying drawings illustrate a socket device according to the present disclosure using a standard three-hole jack as an example, but other types of jacks are also applicable to the present disclosure.

FIG. 1A and FIG. 1B are schematic views of the socket device according to the present disclosure, and show a plug device 1000 for insertion into the socket device. As shown in FIG. 2A, the socket device is a multi-position socket having plural sets of jacks 211 and having a power cord 104. However, it can be understood that in other examples not illustrated, the socket device may have only a single set of jacks 211, and/or may not have an extended power cord. In some examples, the socket device according to the present disclosure is a mobile socket (e.g., the socket device can be moved from one place to another before or during use). For example, the socket device according to the present disclosure may be known as a power strip.

The socket device may also have at least one type of USB interface for supplying power to devices such as cell phones and tablet computers. Types of USB interface may include, but not limited to, USB-A interface, USB-C interface, etc.

Referring to at least FIG. 1A and FIG. 1B, the plug device 1000 may be fully inserted into the socket device and the power circuit may be connected. In this case, according to the present disclosure, a part of the socket device is displaced (e.g., moved) to increase an internal volume at the plug device 1000, thereby providing sufficient space to accommodate the pins 1010 of the plug device 1000. Compared to socket devices in the related art, this structure can significantly reduce the volume of the socket device according to the present disclosure.

To provide this accommodating space, in an example, the socket device includes the base body 100 and the movable cover 200. The base body 100 has an accommodating space to accommodate electrical components known in the art, such as electrical connectors.

In an example, the movable cover 200 is mounted on the base body 100 and movable with respect to the base body 100 along the first direction D1 between the use position P1 (as shown in at least FIGS. 1A and 1B) and the stowed position P2 (as shown in at least FIGS. 2A and 2B). In the use position P1, the movable cover 200 extends at least partially beyond the base body 100 to fully accommodate the pins 1010 of the plug device 1000 in the socket device, at which time the socket device is in a use state. As shown in at least FIG. 1A and FIG. 1B, a part of the movable cover 200 in the use position P1 extends beyond the base body 100. In an example, in the stowed position P2, the movable cover 200 does not extend beyond the base body 100 to minimize dimensions of the socket device when the socket device is not connected to the plug device 1000, e.g., when the socket device is in an unused state. Alternatively, in the stowed position P2, the movable cover 200 extends beyond the base body 100 by a size smaller than a size by which the movable cover 200 extends beyond the base body 100 in the use position P1. In some examples, in the stowed position P2, the movable cover 200 is flush or substantially flush with a surface of the base body 100 (e.g., the movable cover 200 and the base body 100 share the same surface), so that the socket device has a substantially planar outer surface and is convenient to carry or transport.

Referring to at least FIG. 1A, FIG. 1B, FIG. 2A, and FIG. 2B, when the movable cover 200 is in the use position P1, the maximum dimension of the socket device along the first direction D1 is a first dimension DP1. When the movable cover 200 is in the stowed position P2, the maximum dimension of the socket device along the first direction D1 is a second dimension DP2. The first dimension DP1 is larger than the second dimension DP2. A volume of the socket device in the unused state is smaller than a volume of the socket device in the use state, thereby allowing the pins 1010 of the plug device 1000 to be fully inserted and reducing the space occupied by the socket device. Considering that a housing of the socket device has a certain thickness to maintain strength, the second dimension DP2 is less than or equal to 70% of the first dimension DP1 in some examples.

To make the socket device as compact as possible, the first direction D1 along which the movable cover 200 moves is parallel to a direction in which the plug device 1000 is inserted into the socket device in some examples. Thus, the first dimension DP1 and the second dimension DP2 of the socket device can be illustrated using dimensions of the pin 1010 of the plug device 1000. In some examples, the first dimension DP1 is greater than a length of the pin 1010, and the second dimension DP2 is smaller than the length of the pin 1010, e.g., the second dimension DP2 is smaller than 24.5 mm. For example, for the standard three-hole jacks 211 shown in the figures, the minimum length of pins 1010 of a corresponding standard three-prong plug is 18 mm, so the first dimension DP1 is greater than 18 mm and the second dimension DP2 is smaller than 18 mm. A height in dimensions of length, width and height of the socket device in the unused state is smaller than 18 mm. As another example, for a standard two-hole jack 211 not shown, the minimum length of the pin 1010 of the corresponding standard two-prong plug is 16 mm, so the first dimension DP1 is greater than 16 mm and the second dimension DP2 is smaller than 16 mm. The height of the socket device in the unused state is smaller than 16 mm. In some examples, the second dimension DP2 of the socket device according to the present disclosure is smaller than 18 mm, smaller than 17 mm, or smaller than 16 mm. As a reference, the height of socket devices in the related art having standard three-hole/two-hole jacks is generally in a range of 24.5 to 30.0 mm. As a result, the socket device according to the present disclosure has significantly reduced height dimension compared to the socket devices in the related art, thereby reducing the overall occupied space and improving portability. However, the above values are only examples, and the dimensions of the socket device according to the present disclosure are not limited to the above value ranges.

To ensure that the socket device can normally supply power to the plug device 1000, the socket device further includes jacks 211 disposed in one of the base body and the movable cover. The jacks match the pins of the plug device, allowing the pins of the plug device to enter and exit the accommodating space of the base body through the jacks to be electrically connected with an electrical element in the accommodating space, thereby achieving the function of supplying power to a device connected by the plug device through the socket device.

In an example, referring to at least FIG. 1A, FIG. 1B, FIG. 2A, and FIG. 2B, the jacks 211 of the socket device are disposed on a panel portion 210 at the top of the movable cover 200, and the panel portion 210 has a surface that can be in contact with the plug device 1000. For ease of illustration, the panel portion 210 provided with the jacks 211 is shown as being disposed on the top of the socket device, e.g., the plug device 1000 is inserted downward into the socket device through the top jacks 211. In other words, according to the present example, the plug device 1000 can be inserted downward while the movable cover 200 of the socket device moves upward to provide the accommodating space for the pins of the plug device. It should be understood that the terms of direction "top", "upward", and "downward" as used herein vary depending on the specific use position of the socket device.

In order to switch the movable cover 200 between the use position P1 and the stowed position P2 along the first direction with the insertion and pulling out of the plug device, the socket device of the present disclosure may further include a drive assembly 10 disposed in the accommodating space and connected with the movable cover 200. The drive assembly 10 is configured to: switch the movable cover 200 from the stowed position P2 to the use position P1 in response to insertion of the plug device 1000, and reset the movable cover 200 to the stowed position P2 in response to removal (e.g., pulling out) of the plug device 1000.

The drive assembly may comprise the components as shown in FIG. 3 to FIG. 6, or may comprise alternative or additional components. An example drive assembly is described hereinafter with reference to FIG. 3 to FIG. 6. With reference to FIG. 3 and FIG. 4, the drive assembly 10 includes a floating member 400 (e.g., a sliding device, a block) disposed inside the movable cover 200 and correspond to the jacks 211. When the plug device 1000 is inserted into the jacks 211, the pins 1010 of the plug device 1000 abut against the floating member 400 to apply a force to the floating member 400 in a direction away from the jacks 211, so that the floating member 400 slides in the direction away from the jacks 211 with the insertion of the plug device 1000. In some examples, the floating member 400 includes an elastic member which is a member made of an elastic material. In some examples, a sliding direction of the floating member 400 may be parallel to the insertion direction of the pins.

In an example, in order to define (e.g., determine, limit) the sliding direction of the floating member 400, (e.g., to define that the floating member 400 slides along the first direction D1), the accommodating space of the base body 100 is provided with a first guide groove extending along the first direction D1, and the floating member 400 is configured to slide along the first guide groove. For example, the floating member 400 may reciprocate along a direction defined by the first guide groove.

Continuing to refer to at least FIG. 3 and FIG. 4, the drive assembly 10 also includes a transmission assembly connected to the floating member 400 and the movable cover 200 and configured to drive the movable cover 200 to the use position (e.g., P1) when the floating member 400 slides in the direction away from the jacks.

The transmission assembly 600 may include a first transmission member, a second transmission member, and a reversing transmission member. The first transmission member is connected to the movable cover 200, the second transmission member is connected to the floating member 400, and the reversing transmission member is pivotably connected to the bracket 300 around a pivot shaft 350 perpendicular to the first direction D1 and pivotably connected to the bracket 300. Two sides of the reversing transmission member relative to the pivot shaft 350 are connected to the first transmission member and the second transmission member respectively (e.g., in a transmissive manner), allowing the movable cover 200 and the floating member 400 to move in opposite directions parallel to the first direction D1.

The reversing transmission member may be connected to the floating member 400 and the movable cover 200 and may be configured to drive the movable cover 200 to the use position P1 when the floating member 400 slides in the direction away from the jacks. In some examples, the reversing transmission member may include at least one gear. For example, the first transmission member includes a first rack 610 (e.g., a gear rack), the second transmission member includes a second rack 620, and the reversing transmission member includes a gear 630. The gear 630 meshes with the first rack 610 and the second rack 620 separately. Both a length direction of the first rack 610 and a length direction of the second rack 620 are parallel to the first direction D1 (e.g., teeth on the first rack 610 are arranged along the first direction, and teeth on the second rack 620 are arranged along the first direction D1). Through the above connection manner, when the pins 1010 of the plug device 1000 are inserted into the jacks 211, the pins 1010 abut against the floating member 400. As the pins 1010 move along the first direction D1 to a side away from the jacks 211, the floating member 400 slides along the first direction D1 to the side away from the jacks 211. The floating member 400 is connected to the second rack 620, and a plurality of teeth arranged along the first direction D1 are disposed at a position where the second rack 620 is connected with the reversing transmission member such as the gear 630. One side of the gear 630 meshes with the teeth of the second rack 620, and the other side of the gear 630 meshes with the first transmission member such as the first rack 610 which is connected to the movable cover 200, so that the sliding of the floating member 400 can drive the gear 630 to rotate, and the rotation of gear 630 drives the movable cover 200 connected to the first transmission member to move to the use position P1. In this way, the movable cover 200 is ejected from the base body 100. The accommodating space surrounded by the movable cover 200 and the base body 100 in the use position P1 is sufficient to accommodate the pins 1010 of the plug device 1000, thereby avoiding a safety problem caused by exposure of the pins 1010 and improving safety and reliability of the socket device.

In order to enable the movable cover 200 to be reset to the stowed position P2 when the pins 1010 of the plug device 1000 are pulled out from the socket device, in an example, the socket device further includes a first reset member 114 and a second reset member 115. A first end of the first reset member 114 may be connected to the base body 100, such as to an inside wall of the base body, and a second end of the first reset member 114 is connected to the floating member 400. The first reset member 114 is configured to reset the floating member 400 in response to the plug device 1000 being pulled out. A first end of the second reset member 115 is connected to the movable cover 200, a second end of the second reset member 115 is connected to the base body 100. The second reset member 115 is configured to reset the movable cover 200 to the stowed position P2 in response to the plug device 1000 being pulled out. For example, the second reset member 115 applies a force toward the stowed position P2 on the movable cover 200, thereby enabling the movable cover 200 to be reset to the stowed position P2 with pulling out of the pins 1010, so as to reduce a space volume occupied by the movable cover 200 outside the base body 100, and make a space volume occupied by the entire socket device smaller. In particular, the size of the socket device in the first direction D1 is smaller, thereby enhancing the comfort of use and portability, and the thickness of the socket device in the stowed position P2 is thin, thereby saving packaging and transportation costs.

In some examples, the first reset member 114 may be a spring, and the second reset member 115 may include a spring. The spring(s) may have an axial direction parallel to the first direction D1. A force applied by the first reset member 114 on the floating member 400 is an elastic force. The first reset member 114 may abut against the floating member 400 and apply a force toward the jacks on the floating member 400. A force applied by the second reset member 115 on the movable cover 200 is an elastic force, and the second reset member 115 may abut against the movable cover 200 to apply a force toward the stowed position P2 on the movable cover 200. In this manner, the movable cover 200 may be always held in the stowed position P2 and/or may always tend to return to the stowed position P2 unless the force of the second reset member 115 is overcome. In the unused state, the movable cover 200 may not extend beyond the base body 100 due to combined function of the first reset member 114 and the second reset member 115, thereby maintaining a compact socket device thickness.

The arrangement of the first reset member 114 and the second reset member 115 can be illustrated with reference to the sectional view of FIG. 7. The floating member 400 further includes a recess and a projection disposed within the recess, and the first reset member 114 may abut against the floating member 400, e.g., the first reset member 114 is interposed within the recess and abuts against the projection. The movable cover 200 further includes the panel portion 210 and a support portion 220, the panel portion 210 is substantially formed as a plane, and the support portion 220 extends from the panel portion 210 in the first direction D1. The movable cover 200 is thus configured in a cross-section that is substantially U-shaped. An end of the support portion 220 away from the panel portion 210 is provided with an eave body portion 230 (e.g., a frame in the shape of an eave). The second reset member 115 abuts against the movable cover 200 at the eave body portion 230. For example, the eave body portion 230 has a recess, and part of the second reset member 115 is disposed within the recess. The second reset member 115 disposed in this manner does not interfere with other electrical components such as electrical connectors within the base body 100 of the socket device. The number and positions of the first reset member 114 and the second reset member 115 may be reasonably set according to the actual need. For example, for the movable cover 200, the second reset members 115 may be symmetrically disposed at the eave body portions 230 on opposite sides of the movable cover 200.

In addition, since the movable cover 200 has the above-described substantially U-shaped cross-sectional configuration, foreign matter can be blocked from entering the cavity of the base body 100 during movement of the movable cover 200. The eave body portion 230 protruding from the movable cover 200 also has a limiting effect, such that the movable cover 200 is only capable of moving with respect to the base body 100 between the stowed position P2 and the use position P1 without moving beyond the use position P1, thereby preventing the movable cover 200 from detaching from the base body 100.

Further, FIG. 5 and FIG. 6 show schematic views of the positions of the reversing transmission member as well as the floating member 400 after the floating member 400 and the movable cover 200 have been reset. When the plug device 1000 is pulled out from the socket device, the first reset member 114 applies a force toward a side of the jacks 211 on the floating member 400, and the floating member 400 slides upward in the first direction D1, while the second reset member 115 applies a force toward the stowed position P2 on the movable cover 200, and the movable cover 200 moves toward the stowed position P2. In this process, the floating member 400 may also be driven by the movable cover 200 toward the stowed position P2 through the reversing transmission member such as a gear, so as to reset the movable cover 200 to the stowed position P2.

The inventors of the present disclosure have found it particularly advantageous to use the insertion force of the plug device 1000 to overcome the forces of the first reset member 114 and the second reset member 115. Generally, due to safety requirements, the socket device needs to be provided with a safety device such as a protective door (not shown), which causes a user to apply a certain amount of force to release the safety device when inserting the plug device 1000. According to the present disclosure, the insertion force of the plug device 1000 can be used to overcome the forces of the first reset member 114 and the second reset member 115 to move the movable cover 200 from the stowed position P2 to the use position P1. There is no need to apply additional force or any other operation in this process, and thus the socket device according to the present disclosure is convenient for use.

Taking the illustrated example as an example, the movable cover 200 of the socket device moves upward while the plug device 1000 is inserted downward. In this example, a direction of the insertion force of the plug device 1000 is opposite to a movement direction of the movable cover 200. In some other examples, the jacks 211 of the socket device are disposed on the base body 100, and the movable cover may be disposed on a side of the base body opposite to the jacks 211. While the plug device 1000 is inserted downward, the movable cover 200 of the socket device may also move downward (not shown). The direction of the insertion force of the plug device 1000 is opposite to the direction of movement of the movable cover 200. This can be achieved, for example, by setting the reversing transmission member to have an even number of gears. For example, the reversing transmission member may include a first gear and a second gear, wherein the first gear meshes with the floating member, the second gear meshes with the movable cover, and the first gear and the second gear also mesh with each other. When the floating member moves downward, the floating member drives the first gear to rotate, and the first gear drives the second gear to rotate and drives the movable cover to move downward to the use position.

Only one reversing transmission member such as a gear is shown in the figures to realize insertion of the plug device 1000 to drive the movable cover 200. However, with respect to a central axis of the pins 1010 of the plug device 1000, one or more reversing transmission members such as a gear(s) (not shown) may be disposed on the opposite side of the shown reversing transmission member, e.g., reversing transmission members may be disposed on both sides symmetrical with respect to a central plane.

The socket device may include other components in addition to the structures listed above, which are not specifically described herein.

In summary, by providing the transmission assembly, the socket device of the present disclosure enables the movable cover to be switched from the stowed position to the use position when the plug device is inserted, and to be reset to the stowed position when the plug device is pulled out. Thus, when the plug device is in the use position, the movable cover can move to the use position and surround the pins of the plug device, so as to realize a normal power supply function of the socket device while avoiding exposure of the pins, thereby improving safety. After the plug device is pulled out, the movable cover moves to the stowed position, so that the thickness of the socket device is thinner than that of sockets in the related art, which improves comfort of use and is more convenient to store and carry.

Hereinafter, a detailed structure of the socket device in an example of the present disclosure is described in conjunction with FIG. 8 to FIG. 23, and technical features of the examples of the present disclosure can be combined with each other. As shown in FIG. 8 to FIG. 23, the socket device according to the present disclosure includes a base body 100, a movable cover 200, a bracket 300, a floating member 400, a self-locking member 500, a transmission assembly 600 and an elastic member.

The base body 100 includes an upper base body 110, a lower base body 120, and an accommodating space 130 disposed between the upper base body 110 and the lower base body 120. The upper base body 110 has an opening 111. The movable cover 200 has jacks 211, and is movably connected to the opening 111 along a first direction D1 between a use position of protruding from the opening 111 and a stowed position of retracting in the accommodating space 130. The first direction D1 is parallel to a hole depth direction of the jacks 211. The bracket 300 is disposed within the accommodating space 130 and corresponds to the opening 111, is connected to the lower base body 120, and has a first guide member extending along the first direction D1 and a first locking portion extending along a second direction D2 perpendicular to the first direction D1.

The floating member 400 is movably connected to the first guide member along the first direction D1 between a first position and a second position, where the first position is closer to the movable cover 200 than the second position. The floating member 400 has a second guide member.

The self-locking member 500 has a second locking portion adapted to the first locking portion and a guiding slope 520 for abutting against the pin 1010. The self-locking member 500 is movably connected to the second guide member along the second direction D2 between a locked position and an unlocked position. The self-locking member 500 in the locked position causes the second locking portion to contact the first locking portion, and the self-locking member 500 in the unlocked position causes the second locking portion to disengage from the first locking portion. The guiding slope 520 has a first end 521 and a second end 522 spaced apart along the second direction D2, and a distance from the first end 521 to the movable cover 200 is less than a distance from the second end 522 to the movable cover 200. The self-locking member 500 drives the floating member 400 to move from the first position to the second position, and the self-locking member 500 moves from the unlocked position to the locked position while the pins 1010 are inserted into the jacks 211 and contact the guiding slopes 520.

The transmission assembly 600 includes a first transmission member, a second transmission member, and a reversing transmission member. The first transmission member is connected to the movable cover 200, the second transmission member is connected to the floating member 400, and the reversing transmission member is pivotably connected to the bracket 300 around a pivot shaft 350 perpendicular to the first direction D1. The two sides of the reversing transmission member with respect to the pivot shaft 350 are connected to the first transmission member and the second transmission member respectively (e.g., in a transmissive manner), to cause the movable cover 200 and the floating member 400 to move in opposite directions parallel to the first direction D1 separately. Two ends of the elastic member are connected to the floating member 400 and the self-locking member 500, respectively to apply a force on the self-locking member 500, which causes the self-locking member 500 to move along the second direction D2 toward the unlocked position.

By disposing the base body 100 having the accommodating space 130 inside and the opening 111 outside and movably disposing the movable cover 200 having jacks 211 along the first direction D1 at the opening 111, the socket device of the present disclosure is in the use position when the movable cover 200 extends from the opening 111 and in the stowed position when the movable cover 200 retracts into the accommodating space 130. By disposing the bracket 300 corresponding to the opening 111 in the accommodating space 130, disposing the first guide member along the first direction D1 and the first locking portion perpendicular to the first direction D1 on the bracket 300, and movably connecting the floating member 400 to the first guide member along the first direction D1, so that the floating member 400 moves between the first position and the second position along the first direction D1 relative to the bracket 300, and the floating member 400 is closer to the movable cover 200 in the first position.

The floating member 400 has the second guide member. The self-locking member 500 is movably connected to the second guide member along the second direction D2 and has the second locking portion adapted to the first locking portion and the guiding slope 520 for abutting the pin 1010. While the pins 1010 are inserted into the jacks 211 and contact the guiding slopes 520, the self-locking member 500 first moves with the floating member 400 from the first position to the second position. In the second position, the self-locking member 500 continues to move from the unlocked position to the locked position along the second direction D2 since the guiding slope 520 is abutted against by the pin 1010. When the self-locking member 500 is in the locked position, the first locking portion and the second locking portion contact and are locked along the first direction D1, at which time the movable cover 200 cannot move toward the stowed position along the first direction D1. Then, by disposing the transmission assembly 600, the floating member 400 and the movable cover 200 move in opposite directions, e.g., the movable cover 200 moves toward the use position when the floating member 400 moves toward the second position. By disposing the elastic member to provide a force to the self-locking member 500, the self-locking member 500 can automatically reset to the unlocked position after the pins 1010 are pulled out. By adopting the above technical solution, movement freedom of the movable cover 200 retracting along the first direction D1 can be restricted after the plug device 1000 is inserted into the socket device, thereby preventing a situation in which a gap between the plug device 1000 and the movable cover 200 occurs by mistakenly pressing the movable cover 200, which helps to reduce the risk of electric shock, and thus improves electricity safety.

Figure 10:
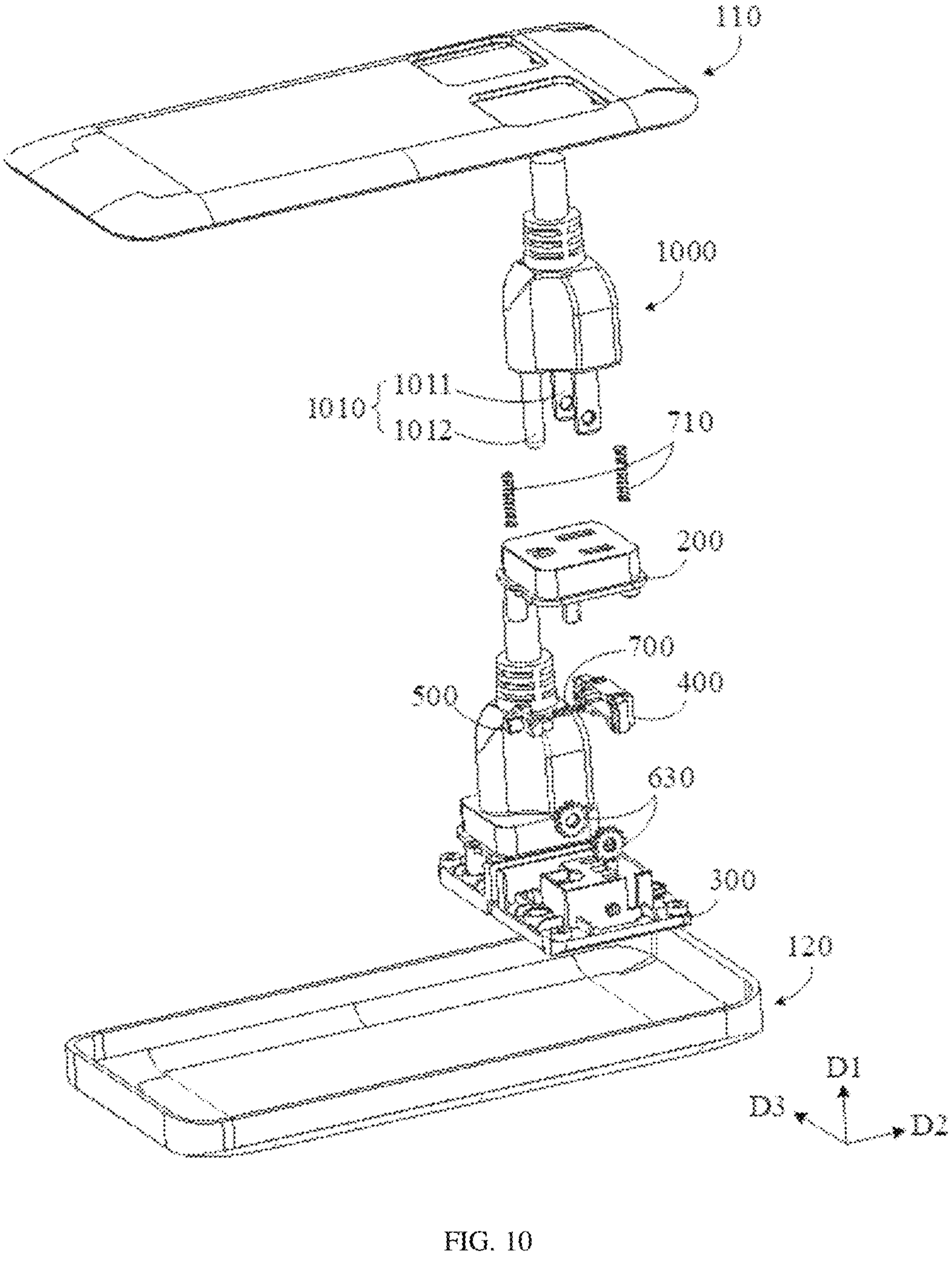
FIG. 10 shows a three-dimensional view of the socket device and the plug device shown in FIG. 8 in a disassembled state.
Figure 11:
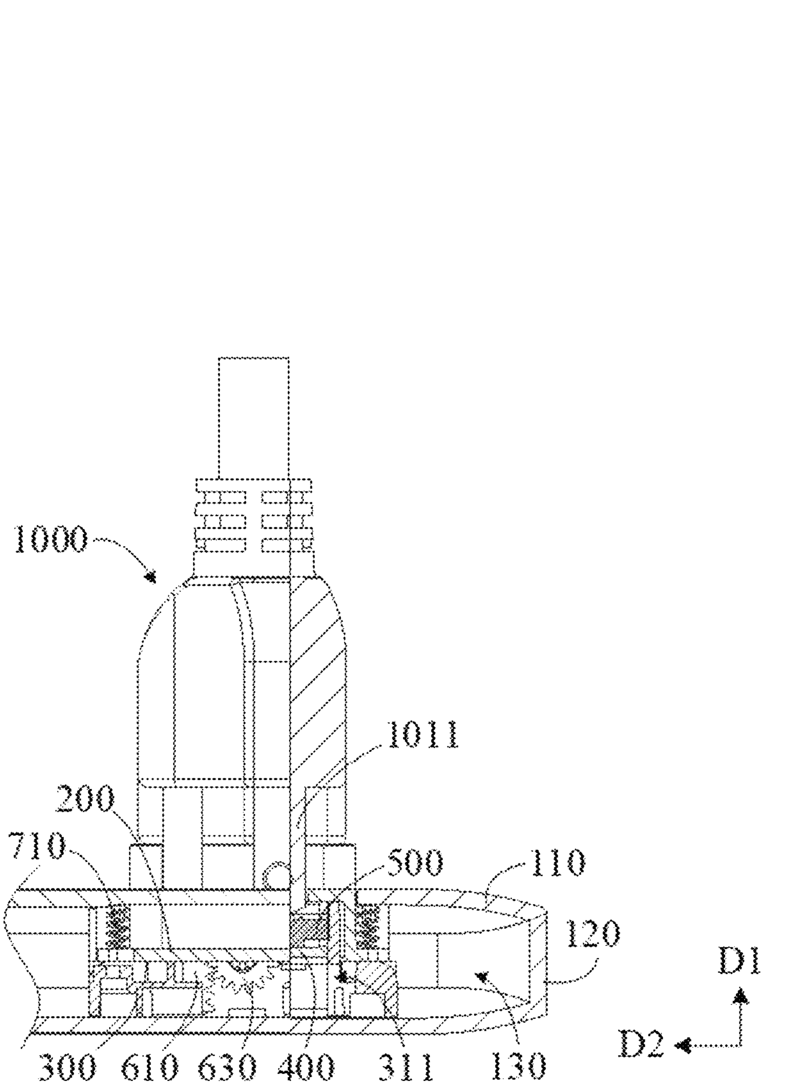
FIG. 11 shows a sectional view cut along line A-A in FIG. 9, in which a movable cover is in a stowed position, a floating member is in a first position, and a self-locking member is in an unlocked position.
Figure 12:
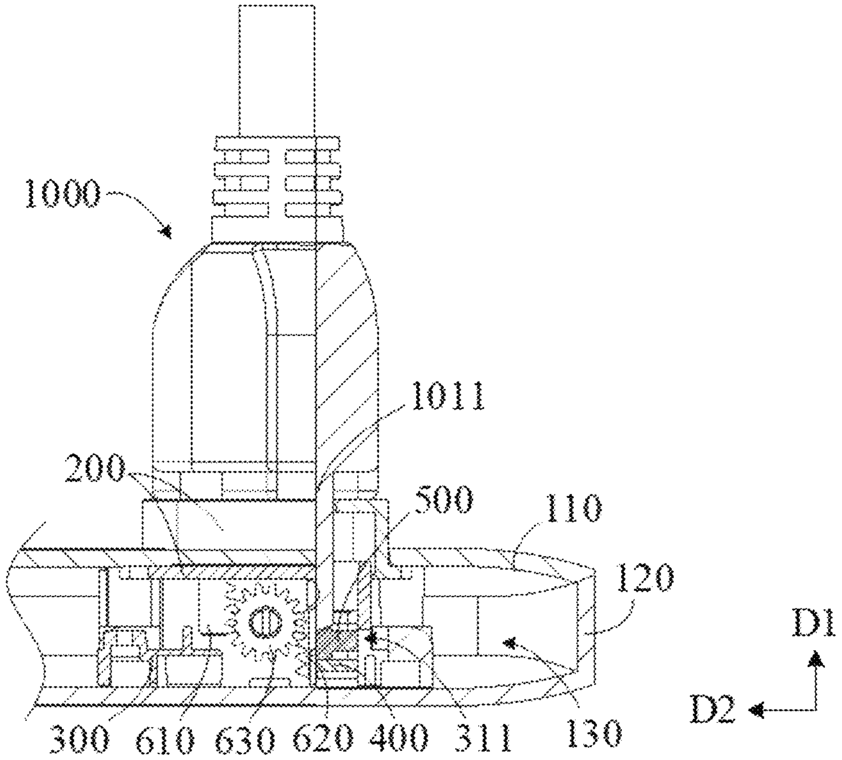
FIG. 12 shows another sectional view cut along line A-A in FIG. 9, in which the movable cover is in a use position, the floating member is in a second position, and the self-locking member is in the unlocked position.
Figure 13:
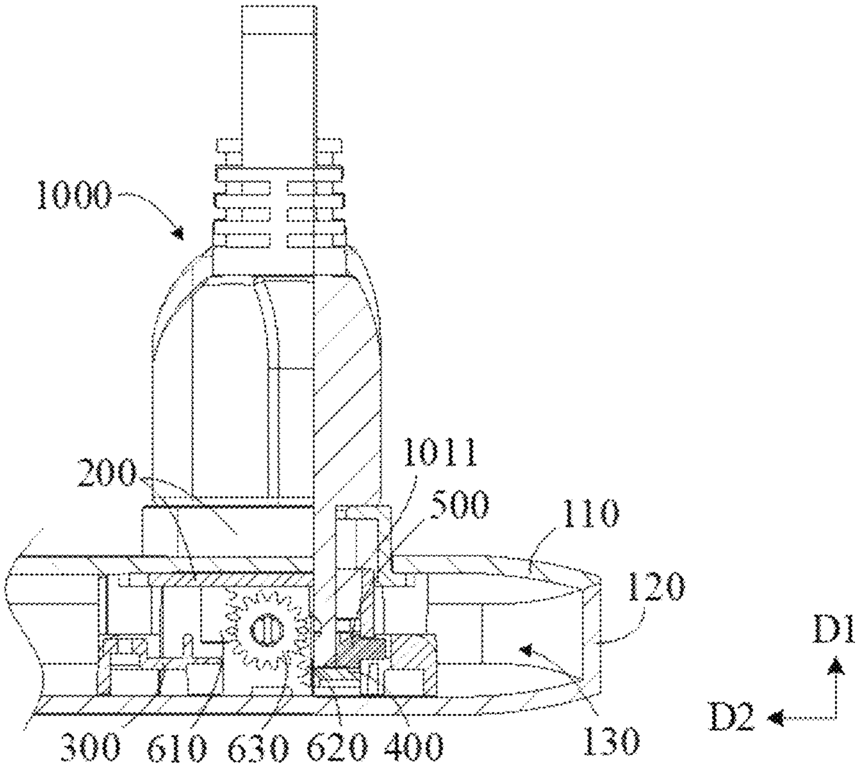
FIG. 13 shows a yet another sectional view cut along line A-A in FIG. 9, in which the movable cover is in the use position, the floating member is in the second position, and the self-locking member is in a locked position.
Figure 14:
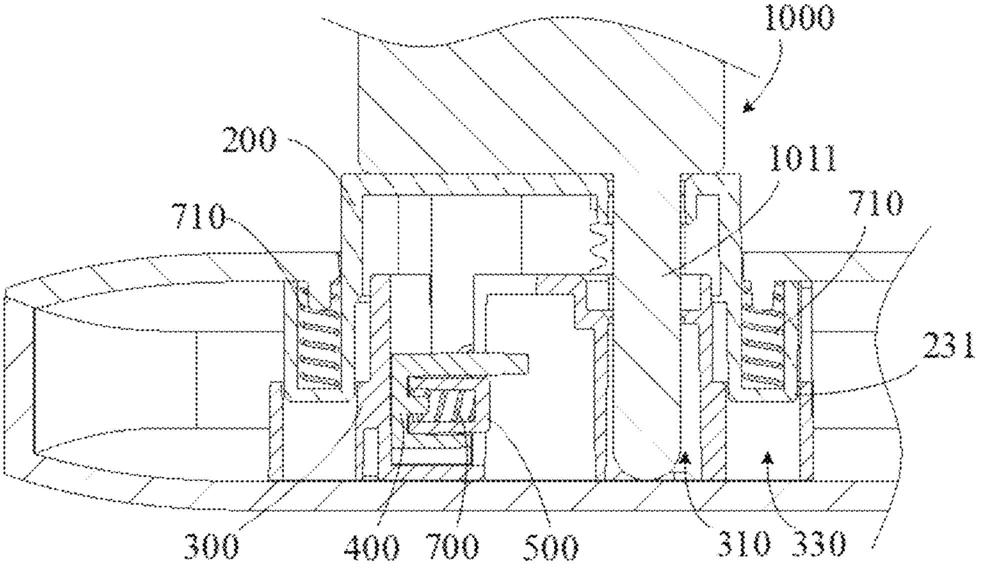
FIG. 14 shows a partial sectional view of the socket device connected to the plug device shown in FIG. 8, in which the movable cover is in the use position, the floating member is in the second position, and the self-locking member is in the locked position.
Figure 15:
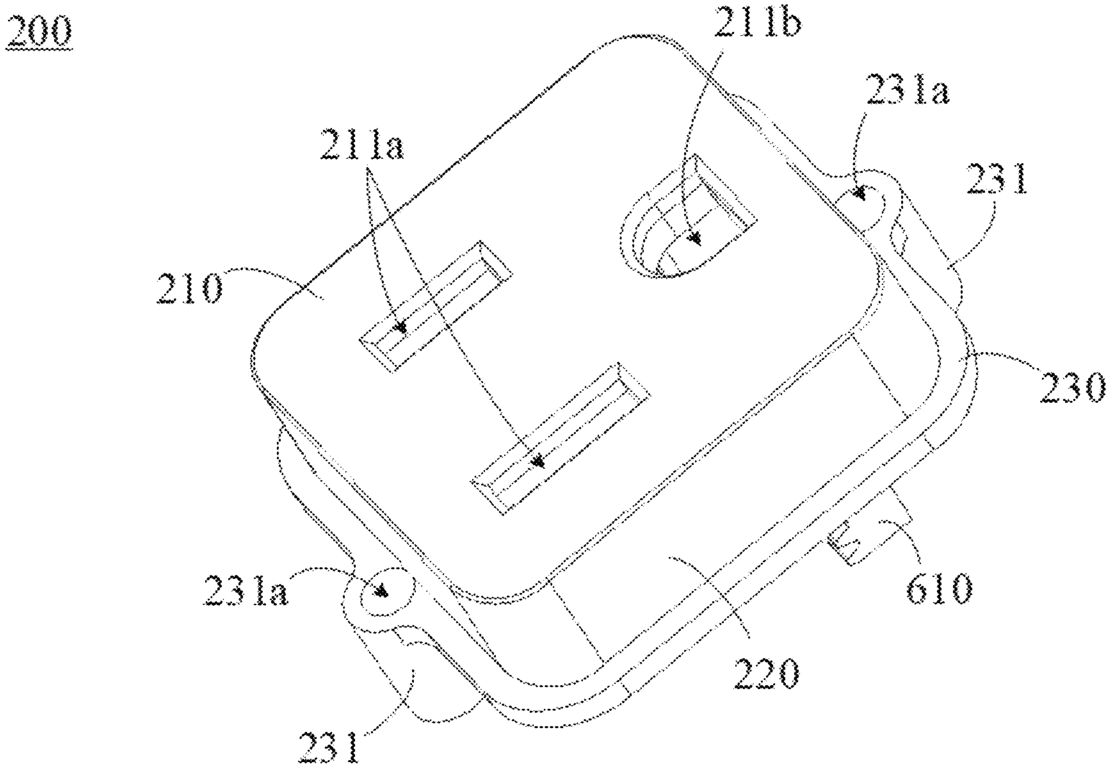
FIG. 15 shows a three-dimensional view of the movable cover shown in FIG. 8 to FIG. 14.
Figure 16:
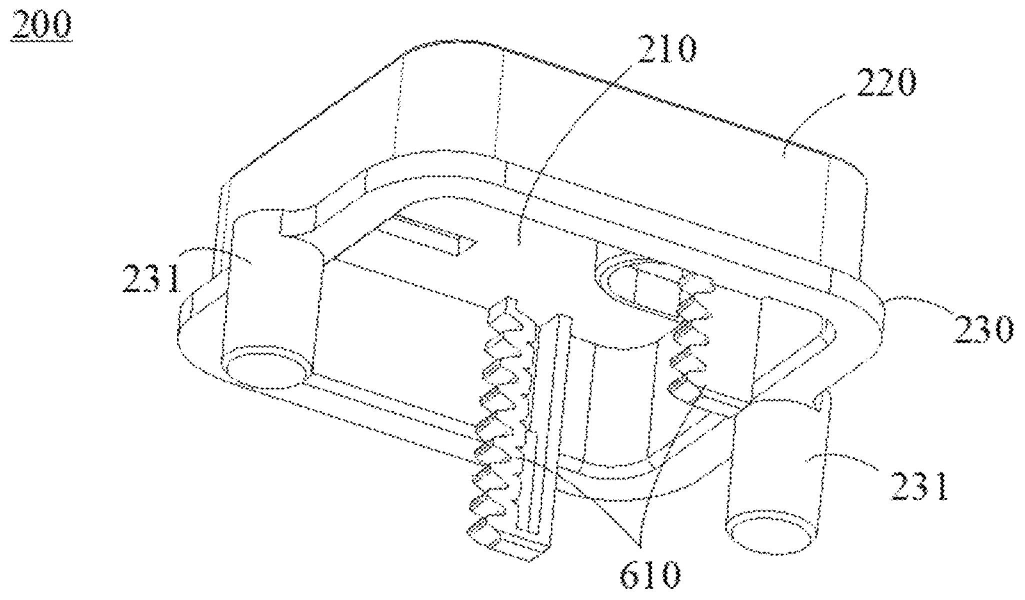
FIG. 16 shows another three-dimensional view of the movable cover shown in FIG. 8 to FIG. 14.
Figure 17:
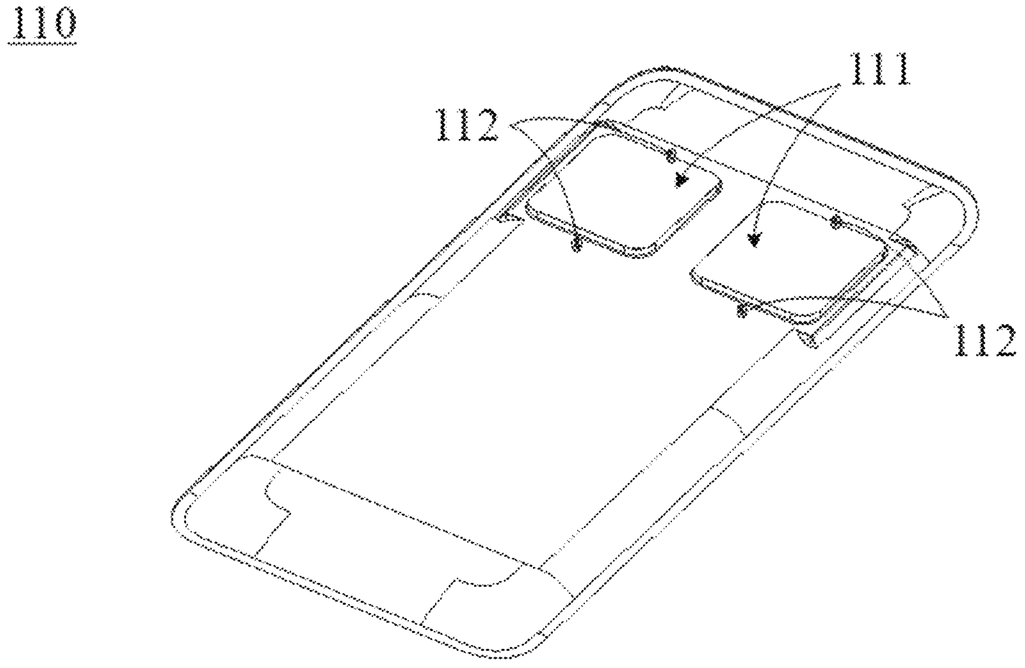
FIG. 17 shows a three-dimensional view of an upper base body shown in FIG. 8 to FIG. 14.
Figure 18:
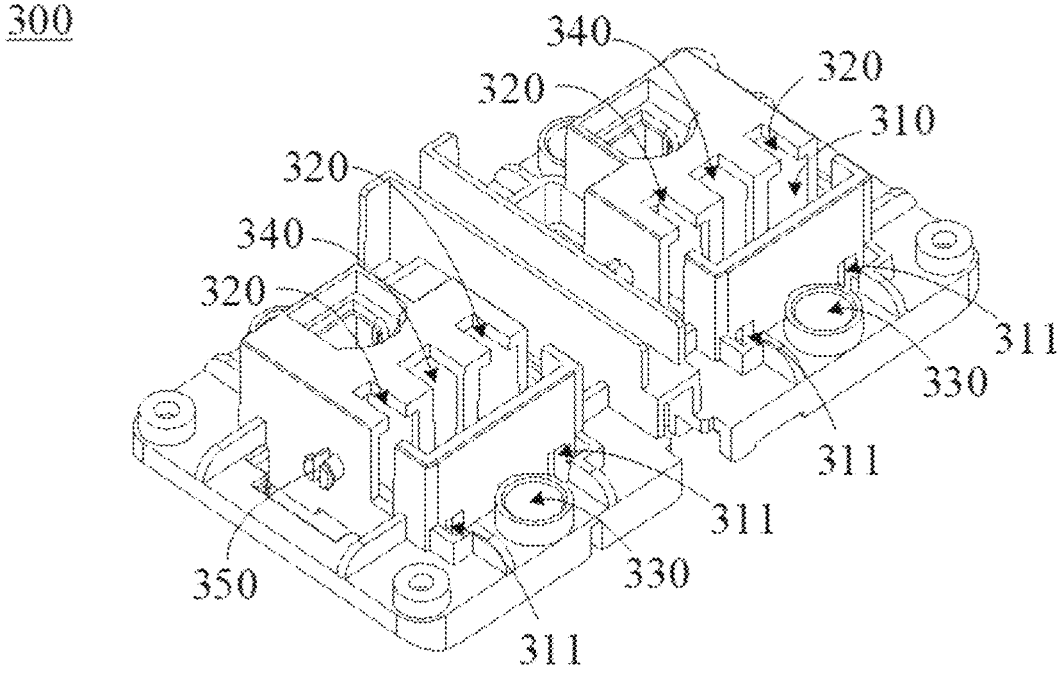
FIG. 18 shows a three-dimensional view of a bracket shown in FIG. 10 to FIG. 14.
Figure 19:
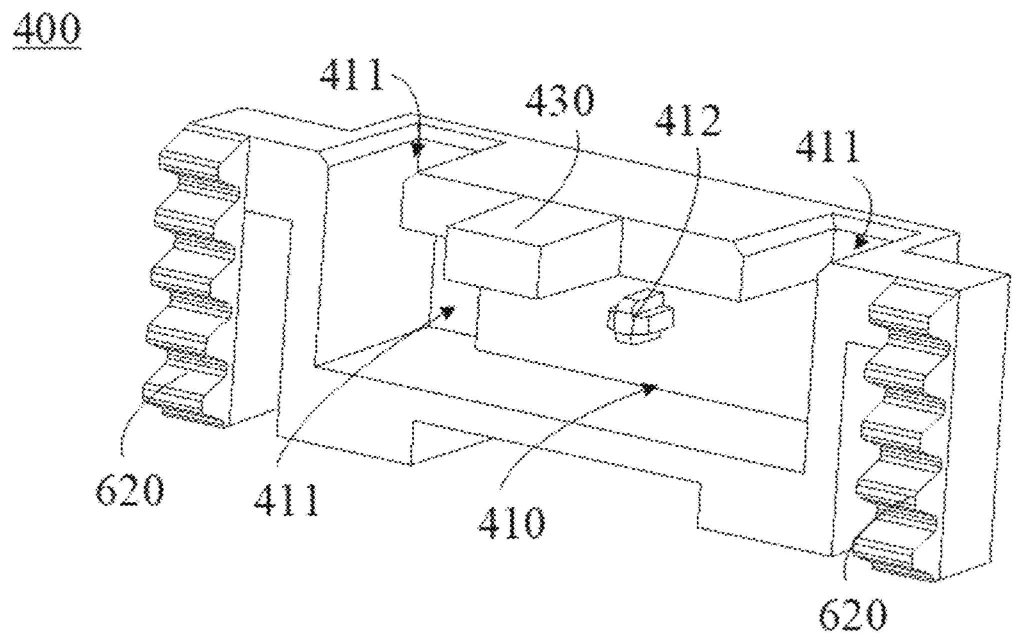
FIG. 19 shows a three-dimensional view of the floating member shown in FIG. 10 to FIG. 14.
Figure 20:
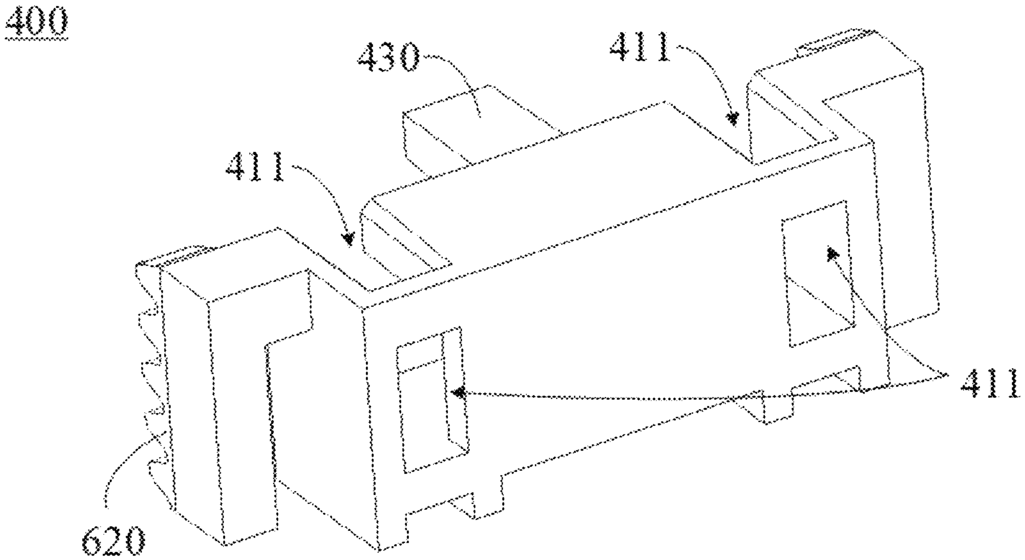
FIG. 20 shows another three-dimensional view of the floating member shown in FIG. 10 to FIG. 14.
Figure 21:
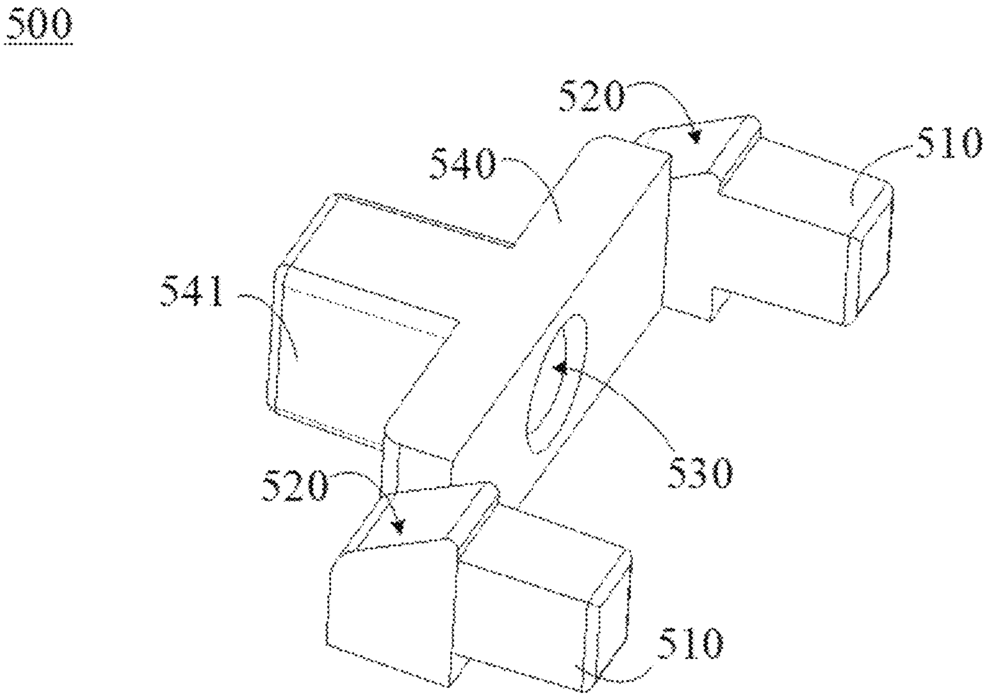
FIG. 21 shows a three-dimensional view of the self-locking member shown in FIG. 10 to FIG. 14.
Figure 22:
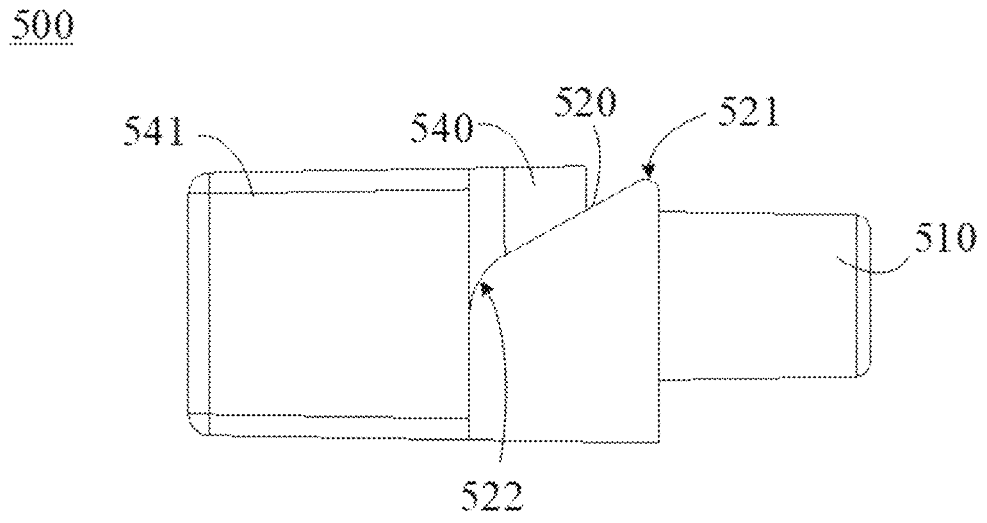
FIG. 22 shows a side view of the self-locking member shown in FIG. 10 to FIG. 14.
Figure 23:
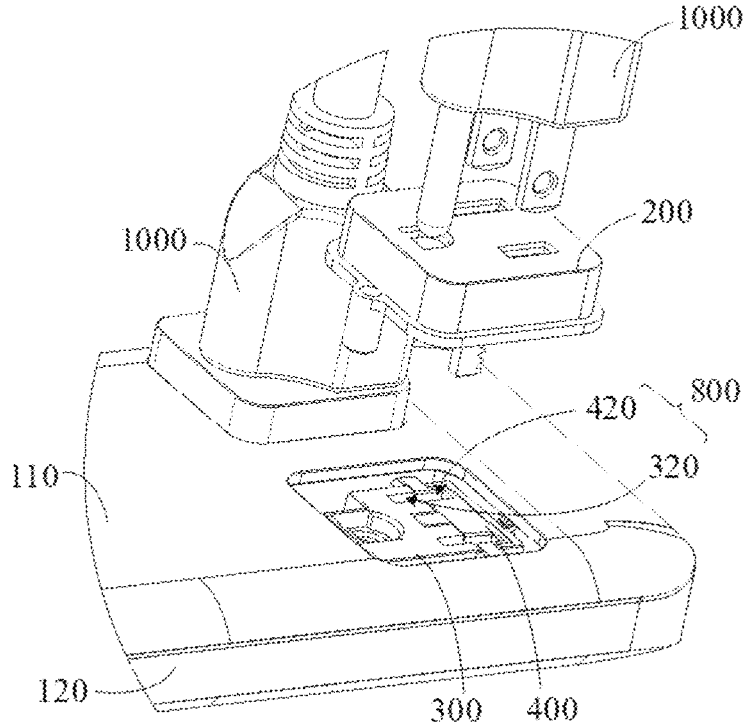
FIG. 23 shows a partial three-dimensional view of the socket device and the plug device shown in FIG. 8 in a disassembled state.

In addition, referring to at least FIG. 10, FIG. 11, and FIG. 14, the socket device further includes a second reset member which is connected to the movable cover 200 and configured to apply to the movable cover 200 a force that causes the movable cover 200 to move along the first direction D1 toward the stowed position. The second reset member is in a state of stored energy after the plug device 1000 is inserted into the socket device, and the second reset member releases elastic potential energy to drive the movable cover 200 to move toward the stowed position after the plug device 1000 is detached from the socket device, so as to drive the movable cover 200 to move toward the stowed position.

Referring to at least FIG. 8 to FIG. 16, FIG. 19 and FIG. 20, implementation of the transmission assembly 600 may be, for example, that the first transmission member comprises a first rack 610, the second transmission member comprises a second rack 620, and the reversing transmission member comprises a gear 630. Teeth on opposite sides of the gear 630 mesh with the first rack 610 and the second rack 620, respectively. A length direction of the first rack 610 and a length direction of the second rack 620 are both parallel to the first direction D1. During insertion of the plug device 1000 into the socket device, the pins 1010 abut against the self-locking member 500, which then drive the floating member 400 and the movable cover 200 away from each other. When the movable cover 200 and the floating member 400 are furthest away from each other, the movable cover 200 is still at a certain distance from the plug device 1000. As the plug device 1000 continues to be inserted into the socket device, the plug device 1000 abuts against the guiding slopes 520 of the self-locking member 500, so that the self-locking member 500 moves from the unlocked position to the locked position along the second direction D2 until the self-locking member 500 switches to the locked position, at which time the freedom degree of the movable cover 200 along the first direction D1 is restricted, so as to prevent the movable cover 200 from moving toward the stowed position due to mis-operation of pressing the movable cover 200.

Referring to at least FIG. 10 to FIG. 14, and FIG. 18 to FIG. 20, the first guide member may include a first guide groove 310. The first guide groove 310 is recessed in the first direction D1 from a surface of the bracket 300 close to the upper base body 110, i.e. the first guide groove 310 is recessed in the first direction D1 from a surface of the bracket 300 close to the opening 111. A profile configuration of the floating member 400 is adapted to the first guide groove 310. The floating member 400 movably fits to the first guide groove 310 along the first direction D1 (e.g., in a sliding manner), and the floating member 400 in the second position abuts against a bottom surface of the first guide groove 310. The second guide member comprises a second guide groove 410 recessed from a side of the floating member 400 along the second direction D2. The self-locking member 500 movably fits in the second guide groove 410 along the second direction D2 (e.g., in a sliding manner). An opening of the second guide groove 410 opens in the same direction as the self-locking member 500 moves from the locked position to the unlocked position. A bottom of the second guide groove 410 is provided with a locking via hole 411 for the second locking portion to move through in the second direction D2, and a side of the second guide groove 410 close to the movable cover 200 is provided with a first insertion notch 420 for the pin 1010 to move through. While the pins 1010 are inserted into the socket, the pins 1010 pass through the jacks 211 and the first insertion notch 420 on the movable cover 200 in turn and then abuts against the guiding slopes 520 of the self-locking member 500. Since the freedom degree of the self-locking member 500 moving along the second direction D2 is restricted before the self-locking member 500 reaches the bottom of the second guide groove 410, the self-locking member 500 drives the floating member 400 to move together under the abutting force of the pins 1010. Until the floating member 400 moves to the second position, the self-locking member 500 moves in the second direction D2 under the action of the guiding slope 520 abutting against the pin 1010, so that the second locking portion passes through the locking via hole 411 and abuts against the first locking portion, preventing movement of the floating member 400 and the movable cover 200 in the first direction D1.

Since the pins 1010, after being fully inserted into the socket, form an electrical connection with a plug bush disposed within the socket, when the floating member 400 is in the second position and the self-locking member 500 is in the locked position, a portion of the pins 1010 abuts against the second end 522 of each guiding slope 520, and the other portion of the pins 1010 is inserted into the plug bush. In this regard, referring to at least FIG. 10 to FIG. 14, and FIG. 18 to FIG. 20, according to the socket device of the present disclosure, a surface of the bracket 300 facing the upper base body 110 has second insertion notches 320, and the first insertion notch 420 and the second insertion notches 320 on the floating member 400 in the first position are spliced together to form an insertion via hole 800 adapted to the pins 1010. The pins 1010 pass through the jacks 211 on the movable cover 200 and then enters the insertion via hole 800, which on one hand, can locate the pins 1010 using the insertion via hole 800, and on the other hand, can guide the pins 1010 with the first insertion notch 420 and the second insertion notches 320 away from each other to prevent the pins 1010 from skewing while continuing insertion of the pins 1010.

Referring to at least FIG. 10 to FIG. 14, and FIG. 18 to FIG. 23, a guide groove 340 extending along the first direction D1 is disposed on the bracket 300 between the two second insertion notches 320, and the guide groove 340 is in communication with the first guide groove 310, and accordingly, the floating member 400 is provided with a first guiding block 430 to which the guide groove 340 movably fits along the first direction D1 (e.g., in a sliding manner). The self-locking member 500 may be provided with a second guiding block 541 adapted to the guide groove 340. In this way, during the movement of the floating member 400 and the self-locking member 500 along the first direction D1, the guide groove 340 is also capable of constituting a sliding guiding fit with the self-locking member 500 and the floating member 400 respectively along the first direction D1, and is capable of defining positions of the floating member 400 and the self-locking member 500 along a third direction D3.

Referring to at least FIG. 10 to FIG. 15, and FIG. 18 to FIG. 20, the jacks 211 on the movable cover 200 include at least two first jacks 211*a*, and may further include a second jack 211*b*. The two first jacks 211*a* may correspond to the polarities of the neutral wire and the live wire of the power cord. The second jack 211*b* corresponds to the polarity of the ground wire of the power cord. For example, the movable cover 200 may have only two first jacks 211*a* to be adapted to the plug device 1000 having two pins 1010; or may have two first jacks 211*a* and one second jack 211*b*, thereby being adapted to the plug device 1000 having three pins 1010; or may have five jacks 211 by combining the foregoing two forms, e.g., specifically including two sets of jacks 211, one set of which includes two first jacks 211*a*, and the other set of which includes two first jacks 211*a* and one second jack 211*b*. Correspondingly, the pins 1010 of the plug device 1000 also include first pins 1011 and a second pin 1012. If the plug device 1000 is properly connected to the socket, the pins 1010 inserted into the first jacks 211*a* may be considered as the first pins 1011, and the pin 1010 inserted into the second jack 211*b* may be considered as the second pin 1012.

Additionally, referring to at least FIGS. 15, 16, 21, and 22, the socket device further includes first plug bushes corresponding to the first jacks 211*a*. The first plug bushes are connected to the bracket 300, the first plug bushes are located on a side of the movement path of the floating member 400, and both the first plug bush and the guiding slope 520 correspond to the insertion via hole 800. While the pin 1010 is inserted into the first plug bush, the pin 1010 contacts the guiding slope 520 and moves from the first end 521 to the second end 522. In other words, while the pin 1010 moves from the first end 521 toward the second end 522 of the guiding slope 520, the pin 1010 is inserted into the first plug bush.

Referring to at least FIG. 10 to FIG. 23, in terms of realizing a locking fit between the self-locking member 500 and the bracket 300, the first locking portion of the present disclosure comprises a locking port 311 extending from a side wall of the first guide groove 310 along the second direction D2, and the second locking portion comprises a locking projection 510 projecting along the second direction D2, and the locking projection 510 is closer to the first end 521 than the second end 522 of the guiding slope 520. By means of the fit of the locking projection 510 with the locking port 311, the freedom degree of the self-locking member 500 along the first direction D1 can be reliably restricted.

Referring to at least FIG. 10 to FIG. 14, and FIG. 18 to FIG. 23, the locking port 311 may extend to the outer surface of the bracket 300 along the first direction D1. This may increase the insertion depth of the locking projection 510 into the locking port 311, thereby making the locking fit between the self-locking member 500 and the bracket 300 more reliable and firm.

Referring to at least FIG. 8 to FIG. 23, the two first plug bushes are spaced apart along the third direction D3, and the third direction D3 is perpendicular to the first direction D1 and the second direction D2. The self-locking member 500 has two guiding slopes 520 corresponding to the two first plug bushes, respectively. For example, the self-locking member 500 has two locking arms and a connection portion 540 connecting the same ends of the two locking arms. The second guiding block 541 is disposed in the middle of a side of the connection portion 540 away from the locking arm. The locking arm includes guide wedges and the locking projections 510 arranged along the second direction D2, the guide wedge having a profile dimension larger than that of the locking projection 510 such that a limiting step is formed between the guide wedge and the locking projection 510. The limiting step can restrict the guide wedge from passing through the locking via hole 411. The guiding slope 520 is disposed on the guide wedge.

Referring to at least FIG. 10 to FIG. 14 and FIG. 19 to FIG. 23, the above-described elastic member may comprise a first compression spring 700. A side of the self-locking member 500 toward the bottom of the second guide groove 410 is connected to one end of the first compression spring 700, and the other end of the first compression spring 700 is connected to the bottom of the second guide groove 410. For example, a first spring locating hole 530 is disposed in a surface of the self-locking member 500 toward the bottom of the second guide groove 410, and a first spring locating post 412 is disposed at the bottom of the second guide groove 410. The first spring locating hole 530 may be disposed in the bottom of the second guide groove 410 and the first spring locating post 412 may be disposed on the self-locking member 500. The first spring locating hole 530 is configured to accommodate one end of the first compression spring 700, and the first spring locating post 412 is configured to insert and locate the other end of the first compression spring 700.

Referring to at least FIG. 8 to FIG. 17, in order to accurately guide movement of the movable cover 200 during the movement of the movable cover 200 along the first direction D1, the socket device of the present disclosure further includes a third guide mechanism in the accommodating space. The third guide mechanism is connected to the movable cover 200, and movably fits to the bracket 300 along the first direction D1 (e.g., in a sliding manner). In another example of the present disclosure, the third guide mechanism may movably fit to the lower base body 120 or the upper base body 110 along the first direction D1 (e.g., in a sliding manner).

Further, referring to at least FIG. 8 to FIG. 18, the second reset member comprises a second compression spring 710. The third guide mechanism may comprise a guide post 231 extending along the first direction D1, and the bracket 300 has a guide hole 330 adapted to the guide post 231. The fit of the guide post 231 with the guide hole 330 allows the movable cover 200 to movably fit the bracket 300 in the first direction D1 (e.g., in a sliding manner). One end of the guide post 231 close to the upper base body 110 has a second spring locating hole 231*a* adapted to the second compression spring 710, and an inner surface of the upper base body 110 has a second spring locating post 112 adapted to the second compression spring 710. With the second spring locating hole 231*a* and the second spring locating post 112, the second compression spring 710 can be reliably located, and the second compression spring 710 can be prevented from disengaging.

Additionally, referring to at least FIG. 8 to FIG. 18, the movable cover 200 is in the form of a cap, and a recess is formed on a side of the movable cover 200 facing the accommodating space 130 and is configured to accommodate the bracket 300 when the movable cover 200 is in the stowed position. A specific construction may be that the movable cover 200 has the panel portion 210, the support portion 220, and the eave body portion 230. The panel portion 210 is adapted to the opening 111, is provided with jacks 211, and is flush with an outer surface of the upper base body 110 in the stowed position. The support portion 220 is formed by extending from an outer peripheral edge of the panel portion 210 toward the lower base body 120 in the first direction D1, is disposed continuously along a peripheral direction of the panel portion 210, and movably fits to the opening 111 along the first direction D1 (e.g., in a sliding manner). The eave body portion 230 is connected to an outer side of the support portion 220 that is away from an end of the panel portion 210, and the eave body portion 230 in the use position abuts against the upper base body 110 to form a limit fit with the upper base body 110 along the first direction D1.

Referring to at least FIG. 8 to FIG. 23, the number of the first racks 610, the second racks 620, and the gears 630 of the present disclosure may be two, respectively. The number of the guide posts 231 and the guide holes 330 may be two respectively as well.

The two first racks 610 are disposed along the third direction D3 on two inner walls of the movable cover 200. The two second racks 620 are disposed along the third direction D3 on two outer sides of the floating member 400, and an end of the second rack 620 close to the movable cover 200 extends along the third direction D3 and is connected to the floating member 400. The bracket 300 is provided with a gap corresponding to extending portion of the second rack 620 such that the second rack 620 can slide therein, the gap is in communication with the first guide groove 310, and a dimension of the gap along the first direction D1 is adapted to a movement range of the extending portion of the second rack 620. The two gears 630 are disposed on two outer sides of the bracket 300 along the third direction D3. The two guide posts 231 are disposed on the two sides of the movable cover 200 along the second direction D2 or the third direction D3 and are connected to the eave body portion 230.

The socket device according to examples of the present disclosure provides a base body having an opening and movably provides a movable cover with jacks along the first direction at the opening. The socket device is in a use position when the movable cover extends from the opening, and is in a stowed position when the movable cover retracts into the accommodating space. By providing a first locking portion perpendicular to the first direction within the base body and movingly connecting the floating member to the base body in the first direction, the floating member moves between the first position and the second position relative to the base body in the first direction, and the floating member is closer to the movable cover in the first position. The self-locking member is movably connected to the base body in the second direction and has a second locking portion adapted to the first locking portion and a guiding slope configured to abut against the pin. While the pins are inserted into the jacks and contact the guiding slopes, the self-locking member first moves with the floating member from the first position to the second position. In the second position, the self-locking member continues to move from the unlocked position to the locked position in the second direction because the guiding slopes abut against the pins. When the self-locking member is in the locked position, the first locking portion and the second locking portion contact and lockingly fit in the first direction, at which time the movable cover cannot move in the first direction toward the stowed position. Then, by providing a transmission assembly, the floating member and the movable cover move in opposite directions, e.g., the movable cover moves toward the use position when the floating member moves toward the second position. By adopting the above technical solution, after the plug device is inserted into the socket device, the movement freedom of the movable cover retracting along the first direction can be restricted after the plug device is inserted into the socket device, thereby preventing a situation in which a gap between the plug device and the movable cover occurs by mistakenly pressing the movable cover, which helps to reduce the risk of electric shock, and thus improves electricity safety.

While exemplary examples have been described herein with reference to the accompanying drawings, it is to be understood that the above exemplary examples are merely exemplary and are not intended to limit the scope of the present disclosure thereto. A person of ordinary skill in the art may make various changes and modifications therein without departing from the scope and spirit of the present disclosure. All such changes and modifications are intended to be included within the scope of the present disclosure as required by the appended claims.

What is claimed is:

1. A charging device comprising:

a housing;

a movable cover coupled to the housing and being movable relative to the housing between a use position and a stowed position, wherein the movable cover in the use position projects above, at least partially, an outer surface of the housing in response to an insertion of a plug device;

a movable assembly configured to move in the housing in response to the insertion of the plug device; and a transfer structure in the housing, wherein the transfer structure has an axis and is configured to rotate about the axis, and wherein the movable assembly is configured to, in response to the insertion of the plug device, cause rotation of the transfer structure to move the movable cover from the stowed position to the use position.

2. The charging device of claim 1, wherein the transfer structure comprises a gear.

3. The charging device of claim 1, wherein the transfer structure comprises a first portion of a first surface and a second portion of a second surface, and wherein the first portion and the second portion are on opposite sides of the transfer structure.

4. The charging device of claim 1, wherein the transfer structure comprises a first side and a second side on opposite ends of the transfer structure.

5. The charging device of claim 1, wherein the housing comprises:

an opening, and a bracket corresponding to the opening and connected to the housing, wherein the bracket comprises a guide groove, and wherein the movable assembly is configured to connect to the guide groove.

6. The charging device of claim 1, further comprising:

a spring connected to the movable cover and the housing, and configured to apply a force to the movable cover to cause the movable cover to move toward the stowed position.

7. The charging device of claim 1, wherein the movable cover is in a form of a cap, and comprises:

a panel comprising holes configured to receive the plug device; and a support formed by extending from an outer peripheral edge of the panel toward a second surface of the housing, wherein the panel and the support form a cavity in which the moving assembly and the transfer structure are located.

8. A charging device comprising:

a housing;

a movable cover coupled to the housing and being movable relative to the housing between a use position and a stowed position, wherein the movable cover in the use position projects above, at least partially, an outer surface of the housing in response to an insertion of a plug device;

a movable assembly; and a transfer structure in the housing having a first portion of a first surface and a second portion of a second surface on opposite sides of the transfer structure, wherein the transfer structure has an axis and is configured to rotate about the axis, and wherein in response to the insertion of the plug device, the movable assembly is configured to be in contact with the first portion of the first surface and cause rotation of the transfer structure to move the movable cover from the stowed position to the use position.

9. The charging device of claim 8, wherein the rotation of the transfer structure causes the second portion of the second surface to move towards to the outer surface of the housing.

10. The charging device of claim 8, wherein the first surface and the second surface are part of the same surface of the transfer structure.

11. The charging device of claim 8, wherein the transfer structure comprises a gear.

12. The charging device of claim 8, wherein the axis is located between the first portion of the first surface and the second portion of the second surface.

13. The charging device of claim 8, wherein the movable assembly is configured to move in the housing in response to the insertion of the plug device.

14. The charging device of claim 8, where the movable assembly comprises a rack configured to be in contact with the first portion of the first surface.

15. A charging device comprising:

a housing;

a movable cover coupled to the housing and being movable relative to the housing between a use position and a stowed position, wherein the movable cover in the use position projects above, at least partially, an outer surface of the housing in response to an insertion of a plug device;

a movable assembly; and a transfer structure in the housing having a first side and a second side, wherein the transfer structure has an axis and is configured to rotate about the axis, and wherein in response to the insertion of the plug device, the movable assembly is configured to be in contact with the first side and cause rotation of the transfer structure to move the movable cover from the stowed position to the use position.

16. The charging device of claim 15, wherein the axis is located between the first side and second side.

17. The charging device of claim 15, wherein the first side and the second side are on opposite ends of the transfer structure.

18. The charging device of claim 15, wherein the rotation of the transfer structure causes the second side to move towards to the outer surface of the housing.

19. The charging device of claim 15, further comprising:

a spring connected to the movable cover and the housing, and configured to apply a force to the movable cover to cause the movable cover to move toward the stowed position.

20. The charging device of claim 15, wherein the movable assembly is configured to move in the housing in response to the insertion of the plug device.

* * * * *